(12) United States Patent
Chen

(10) Patent No.: US 10,812,369 B2
(45) Date of Patent: Oct. 20, 2020

(54) LABEL SWITCHED PATH (LSP) STITCHING WITHOUT SESSION CROSSING DOMAINS

(71) Applicant: Futurewei Technologies, Inc., Plano, TX (US)

(72) Inventor: Huaimo Chen, Bolton, MA (US)

(73) Assignee: Futurewei Technologies, Inc., Plano, TX (US)

(*) Notice: Subject to any disclaimer, the term of this patent is extended or adjusted under 35 U.S.C. 154(b) by 239 days.

(21) Appl. No.: 15/957,661

(22) Filed: Apr. 19, 2018

(65) Prior Publication Data

US 2018/0316596 A1 Nov. 1, 2018

Related U.S. Application Data

(60) Provisional application No. 62/490,854, filed on Apr. 27, 2017.

(51) Int. Cl.
*H04L 12/715* (2013.01)
*H04L 12/46* (2006.01)
*H04L 12/723* (2013.01)

(52) U.S. Cl.
CPC .......... *H04L 45/04* (2013.01); *H04L 12/4633* (2013.01); *H04L 45/50* (2013.01)

(58) Field of Classification Search
CPC ...... H04L 45/04; H04L 12/4633; H04L 45/50
USPC ........................................................ 370/389
See application file for complete search history.

(56) References Cited

U.S. PATENT DOCUMENTS

| 7,489,695 | B1 | 2/2009 | Ayyangar |
| 7,652,983 | B1* | 1/2010 | Li ............................ H04L 41/04 370/217 |
| 8,116,227 | B1* | 2/2012 | Prairie ..................... H04L 45/50 370/254 |
| 8,116,232 | B2* | 2/2012 | Skalecki ........... H04L 29/06027 370/254 |
| 8,571,029 | B1 | 10/2013 | Aggarwal et al. |
| 9,660,897 | B1* | 5/2017 | Gredler ................... H04L 45/50 |

(Continued)

FOREIGN PATENT DOCUMENTS

| CN | 1794691 A | 6/2006 |
| CN | 102340438 A | 2/2012 |

(Continued)

OTHER PUBLICATIONS

Dugeon, O., "A Backward Recursive PCE-initiated inter-domain LSP Setup," draft-dugeon-brpc-stateful-00, Mar. 13, 2017, 16 pages.

(Continued)

*Primary Examiner* — Christopher R Crompton
(74) *Attorney, Agent, or Firm* — Conley Rose, P.C.

(57) ABSTRACT

Methods and apparatus are provided for stitching and/or nesting label-switched path (LSP) segments for creating an end-to-end (E2E) LSP without running a Resource Reservation Protocol-Traffic Engineering (RSVP-TE) session over an inter-domain link. The present disclosure is applicable to various types of domains including, but not limited to, autonomous system (AS) domains and area domains. Advantages of the disclosed embodiments include providing an easy and efficient method for creating E2E LSP, simplifying network operations, and reducing the cost of network Operations, Administration, and Maintenance (OAM).

20 Claims, 14 Drawing Sheets

E2E LSP Nesting Across AS Domains

(56) References Cited

U.S. PATENT DOCUMENTS

| | | | |
|---|---|---|---|
| 2002/0165966 A1* | 11/2002 | Widegren | H04M 15/8016 |
| | | | 709/226 |
| 2004/0165537 A1 | 8/2004 | Lee et al. | |
| 2006/0133265 A1 | 6/2006 | Lee | |
| 2012/0183000 A1 | 7/2012 | Vasseur et al. | |
| 2013/0010589 A1* | 1/2013 | Kini | H04L 45/50 |
| | | | 370/219 |
| 2013/0031271 A1* | 1/2013 | Bosch | H04W 40/36 |
| | | | 709/245 |
| 2014/0098675 A1* | 4/2014 | Frost | H04L 45/50 |
| | | | 370/241.1 |
| 2015/0092776 A1* | 4/2015 | Wijnands | H04L 45/36 |
| | | | 370/392 |
| 2015/0103844 A1* | 4/2015 | Zhao | H04L 45/50 |
| | | | 370/410 |
| 2015/0124830 A1 | 5/2015 | Hu et al. | |
| 2015/0163125 A1* | 6/2015 | Caviglia | H04L 45/44 |
| | | | 370/254 |
| 2016/0014021 A1* | 1/2016 | Li | H04L 47/50 |
| | | | 370/389 |
| 2016/0014022 A1* | 1/2016 | Li | H04L 45/50 |
| | | | 370/389 |
| 2016/0087891 A1 | 3/2016 | Kwon et al. | |
| 2019/0058657 A1* | 2/2019 | Chunduri | H04L 45/12 |
| 2019/0068388 A1* | 2/2019 | Palle | H04L 45/741 |
| 2019/0075048 A1* | 3/2019 | Palle | H04L 45/507 |

FOREIGN PATENT DOCUMENTS

| | | |
|---|---|---|
| CN | 102907051 A | 1/2013 |
| CN | 104365072 A | 2/2015 |

OTHER PUBLICATIONS

Foreign Communication From A Counterpart Application, PCT Application No. PCT/CN2018/084139, English Translation of International Search Report dated Jul. 13, 2018, 5 pages.

Foreign Communication From A Counterpart Application, PCT Application No. PCT/CN2018/084139, English Translation of Written Opinion dated Jul. 13, 2018, 4 pages.

* cited by examiner

E2E LSP crossing ASes (such as AS1,AS2 ..., ASn),

E2E LSP Stitching AS Domains

E2E LSP Stitching AS Domains

E2E LSP Stitching AS Domains

E2E LSP crossing domains that are Areas (Area 2, Area 0, Area 5)

E2E LSP Stitching Area Domains

E2E LSP Stitching Area Domains

E2E LSP Stitching Area Domains

E2E LSP Nesting Across AS Domains

E2E LSP Nesting Across AS Domains

E2E LSP Nesting AS Domains

E2E LSP Nesting Across Area Domains

E2E LSP Nesting Across Area Domains

LABEL SWITCHED PATH (LSP) STITCHING WITHOUT SESSION CROSSING DOMAINS

CROSS-REFERENCE TO RELATED APPLICATIONS

This application claims priority to U.S. Provisional Patent Application No. 62/490,854 filed Apr. 27, 2017 by Huaimo Chen, and titled "Label Switched Path (LSP) Stitching without Session Crossing Domains," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present disclosure relate to the field of network communications, and in particular, to a method and an apparatus for providing label switched path (LSP) stitching without session crossing domains.

BACKGROUND

Large inter-connected networks such as the Internet are made up of domains. A domain is a collection of network devices that are administered as a unit with common rules and procedures. Often data from a source device has to traverse various domains of a network to communicate with a destination device. For this to occur, various communication protocols have been established to enable data to be passed from one domain to another. The present disclosure describes several embodiments for improving data communications between various domains.

SUMMARY

According to a first aspect of the present disclosure, there is provided a method for stitching segments of an LSP crossing multiple autonomous system (AS) domains that are connected by inter-domain links to form an end-to-end (E2E) label-switched path (LSP) without running a Resource Reservation Protocol-Traffic Engineering (RSVP-TE) session over the inter-domain links. In one embodiment, the method includes receiving, by an ingress border node BNi(n), an Explicit Route Object (ERO) containing a path from the ingress border node BNi(n) in the domain(n) to an egress border node BNo(n) in the domain(n); creating, by the ingress border node BNi(n), an LSP tunnel segment from the ingress border node BNi(n) to the egress border node BNo(n) in the domain(n) using the ERO; obtaining, by the ingress border node BNi(n), a next-hop node label (nhnL) and a next-hop node interface (nhnIf) of a next-hop node (nhn) from the ingress border node BNi(n) along the LSP tunnel segment, allocating, by the ingress border node BNi(n), an incoming label (SLn) on the ingress border node BNi(n); obtaining, by the ingress border node BNi(n), an incoming interface (if2n) from an upstream egress node BNo(n−1) to the ingress border node BNi(n); and writing, by the ingress border node BNi(n), a cross connect on BNi(n) using SLn as incoming label, if2n as incoming interface, nhnL as outgoing label, and nhnIf as outgoing interface.

In various embodiments of the first aspect of the present disclosure, the method may also include sending, by the ingress border node BNi(n), a status of the LSP tunnel segment creation in the domain(n) to a Path Computation Element (PCE); sending, by the ingress border node BNi(n), the incoming label (SLn) and the incoming interface (if2n) to the PCE for enabling the upstream egress node BNo(n−1) to write a cross connect on the upstream egress node BNo(n−1) that stitches an upstream LSP tunnel segment in domain(n−1) to the LSP tunnel segment in domain(n); receiving, by the ingress border node BNi(n), a downstream stitching label (SLk) allocated on a downstream ingress border node BNi(n+1) and a downstream stitching interface (if2k) associated with the downstream stitching label (SLk); and sending, by the ingress border node BNi(n), a message to the egress border node BNo(n), the message comprising the downstream stitching label (SLk) and the downstream stitching interface (if2k) for enabling the egress border node BNo(n) to write a cross connect on the egress border node BNo(n) that stitches the LSP tunnel segment in domain(n) to a downstream LSP tunnel segment in domain(n+1).

According to a second aspect of the present disclosure, there is provided a method for stitching segments of an LSP crossing multiple area domains that are connected by Area Border Routers (ABRs) to form an E2E LSP without running an RSVP-TE session over a cross connect on the ABRs. In one embodiment, the method includes receiving, by an ingress border node BNi(n), an ERO containing a path from the ingress border node BNi(n) in the domain(n) to an egress border node BNo(n) in the domain(n); creating, by the ingress border node BNi(n), an LSP tunnel segment from the ingress border node BNi(n) to the egress border node BNo(n) in the domain(n) using the ERO; obtaining, by the ingress border node BNi(n), a next-hop node label (nhnL) and a next-hop node interface (nhnIf) of a next-hop node (nhn) from the ingress border node BNi(n) along the LSP tunnel segment; and sending, by the ingress border node BNi(n), a status of the LSP tunnel segment creation in the domain(n).

In various embodiments of the second aspect of the present disclosure, the method may also include receiving, by the ingress border node BNi(n), a downstream stitching label (SLk) allocated on the egress border node BNo(n) and a downstream stitching interface (if2k) associated with the downstream stitching label (SLk); sending a message to the egress border node BNo(n) that comprises the downstream stitching label (SLk) and the downstream stitching interface (if2k) for enabling the egress border node BNo(n) to write a cross connect on the egress border node BNo(n) using the downstream stitching label (SLk) as an outgoing label and the downstream stitching interface (if2k) as an outgoing interface for stitching the LSP tunnel segment in domain(n) to a downstream LSP tunnel segment in domain(n+1); and sending, by the ingress border node BNi(n), the next-hop node label (nhnL) as the downstream stitching label (SLk), and the next-hop node interface (nhnIf) as the downstream stitching interface (if2k) to a PCE.

According to a third aspect of the present disclosure, there is provided a method for nesting LSP crossing multiple AS domains without running an RSVP-TE session over inter-domain links. In one embodiment, the method includes receiving, by an ingress border node BNi(n), an ERO containing a path from the ingress border node BNi(n) in the domain(n) to an egress border node BNo(n) in the domain (n), upstream egress node BNo(n−1) information, downstream stitching label (SLk) allocated on BNi(n+1) and downstream stitching interface (if2k), a nesting label (Le) for E2E LSP nesting, and a nesting interface (if2e) as an outgoing interface associated with the nesting label (Le); creating, by the ingress border node BNi(n), an LSP tunnel segment from the ingress border node BNi(n) to the egress border node BNo(n) in the domain(n) using the ERO; obtaining, by the ingress border node BNi(n), a next-hop node label (nhnL) and a next-hop node interface (nhnIf) of a next-hop node (nhn) from the ingress border node BNi(n) along the LSP tunnel segment, allocating, by the ingress border node BNi(n), an incoming label (SLn) on the ingress border node BNi(n); obtaining, by the ingress border node BNi(n), an incoming interface (if2n) from an upstream egress node BNo(n−1) to the ingress border node BNi(n); and writing, by the ingress border node BNi(n), a cross connect on BNi(n) using SLn as incoming top label, SLk as the label under the top label, if2n as incoming interface, and nhnL as outgoing label, nhnIf as outgoing interface.

In various embodiments of the third aspect of the present disclosure, the method may also include sending, by the ingress border node BNi(n), a message to the egress border node BNo(n) that comprises the downstream stitching label (SLk) and the downstream stitching interface (if2k) for enabling the egress border node BNo(n) to write a cross connect on the egress border node BNo(n) using the downstream stitching label (SLk) as a second level label and as an outgoing label, and using the downstream stitching interface (if2k) as an outgoing interface for stitching the LSP tunnel segment in domain(n) to a downstream LSP tunnel segment in domain(n+1); and sending a status of the LSP tunnel segment creation in the domain(n), the incoming label (SLn) as the downstream stitching label (SLk), and the incoming interface (if2n) as the downstream stitching interface (if2k) to a PCE.

According to a fourth aspect of the present disclosure, there is provided a method for nesting LSP crossing multiple area domains without running an RSVP-TE session over a cross connect on an ABR. In one embodiment, the method includes receiving, by an ingress border node BNi(n), an ERO containing a path from the ingress border node BNi(n) in the domain(n) to an egress border node BNo(n) in the domain(n), a nesting label (Le) for E2E LSP nesting, and a nesting interface (if2e) as an outgoing interface associated with the nesting label (Le); creating, by the ingress border node BNi(n), an LSP tunnel segment from the ingress border node BNi(n) to the egress border node BNo(n) in the domain(n) using the ERO; obtaining, by the ingress border node BNi(n), a next-hop node label (nhnL) and a next-hop node interface (nhnIf) of a next-hop node (nhn) from the ingress border node BNi(n) along the LSP tunnel segment; and sending, by the ingress border node BNi(n), a message to the egress border node BNo(n) that comprises the nesting label (Le) and the nesting interface (if2e) for enabling the egress border node BNo(n) to write a cross connect on the egress border node BNo(n) using the nesting label (Le) as a second level label and using the nesting interface (if2e) as an outgoing interface for stitching the LSP tunnel segment in domain(n) to a downstream LSP tunnel segment in domain (n+1).

In various embodiments of the fourth aspect of the present disclosure, the method may also include sending, by the ingress border node BNi(n), a status of the LSP tunnel segment creation in the domain(n), the next-hop node label (nhnL) as the downstream stitching label (SLk), and the next-hop node interface (nhnIf) as the downstream stitching interface (if2k) to a PCE; receiving, by the ingress border node BNi(n), a downstream stitching label (SLk) allocated on the next-hop node (NHo1) of BNo(1) and a downstream stitching interface (if2k); and writing, by the ingress border node BNi(n), a cross connect on BNi(n) using the next-hop node label (nhnL) as top level label, SLk as second level label under the top level label, Le as a third level label, and nhnL as outgoing label, nhnIf as outgoing interface.

According to a fifth aspect of the present disclosure, there is provided an ingress border node BNi(n) configured to stitch segments of a LSP crossing multiple AS domains that are connected by inter-domain links to form an E2E LSP without running a RSVP-TE session over the inter-domain links, where n is an integer variable that is a number representing a domain being connected for the E2E LSP. In one embodiment, the ingress border node BNi(n) comprises a network communication interface configured to enable communication over a network; memory configured to store data and executable instructions; and a processing unit configured to execute the executable instructions to: receive an ERO containing a path from the ingress border node BNi(n) in a domain(n) to an egress border node BNo(n) in the domain(n); create an LSP tunnel segment from the ingress border node BNi(n) to the egress border node BNo(n) in the domain(n) using the ERO; obtain a next-hop node label (nhnL) and a next-hop node interface (nhnIf) of a next-hop node (nhn) of the ingress border node BNi(n) along the LSP tunnel segment; allocate an incoming label (SLn) on the ingress border node BNi(n); obtain an incoming interface (if2n) from an upstream egress node BNo(n−1) to the ingress border node BNi(n); and write a cross connect on BNi(n) using SLn as incoming label, if2n as incoming interface, nhnL as outgoing label, and nhnIf as outgoing interface.

In various embodiments of the fifth aspect of the present disclosure, the processing unit may further execute the executable instructions to perform one or more of the following instructions: send a status of the LSP tunnel segment creation in the domain(n) to a PCE; send the incoming label (SLn) and the incoming interface (if2n) to the PCE for enabling the upstream egress node BNo(n−1) to write a cross connect on the upstream egress node BNo(n−1) that stitches an upstream LSP tunnel segment in domain(n−1) to the LSP tunnel segment in domain(n); receive a downstream stitching label (SLk) allocated on a downstream ingress border node BNi(n+1) and a downstream stitching interface (if2k) associated with the downstream stitching label (SLk); and send a message to the egress border node BNo(n), the message comprising the downstream stitching label (SLk) and the downstream stitching interface (if2k) for enabling the egress border node BNo(n) to write a cross connect on the egress border node BNo(n) that stitches the LSP tunnel segment in domain(n) to a downstream LSP tunnel segment in domain(n+1).

According to a sixth aspect of the present disclosure, there is provided an ingress border node BNi(n) configured to stitch segments of a LSP crossing multiple area domains that are connected by ABRs to form an E2E LSP without running a RSVP-TE session over a cross connect on the ABRs, where n is an integer variable that is a number representing a domain being connected for the E2E LSP. In one embodiment, the ingress border node BNi(n) comprises a network communication interface configured to enable communication over a network; memory configured to store data and executable instructions; and a processing unit configured to execute the executable instructions to: receive an ERO containing a path from the ingress border node BNi(n) in a domain(n) to an egress border node BNo(n) in the domain (n); create an LSP tunnel segment from the ingress border node BNi(n) to the egress border node BNo(n) in the domain(n) using the ERO; obtain a next-hop node label (nhnL) and a next-hop node interface (nhnIf) of a next-hop node (nhn) of the ingress border node BNi(n) along the LSP tunnel segment; and send a status of the LSP tunnel segment creation in the domain(n).

In various embodiments of the sixth aspect of the present disclosure, the processing unit may further execute the executable instructions to perform one or more of the following instructions: receive a downstream stitching label (SLk) allocated on the next-hop node of the egress border node BNo(n) and a downstream stitching interface (if2k) associated with the downstream stitching label (SLk); send a message to the egress border node BNo(n) that comprises the downstream stitching label (SLk) and the downstream stitching interface (if2k) for enabling the egress border node BNo(n) to write a cross connect on the egress border node BNo(n) using the downstream stitching label (SLk) as an outgoing label and the downstream stitching interface (if2k) as an outgoing interface configured to stitch the LSP tunnel segment in domain(n) to a downstream LSP tunnel segment in domain(n+1); and send the next-hop node label (nhnL) as the downstream stitching label (SLk), and the next-hop node interface (nhnIf) as the downstream stitching interface (if2k) to a PCE.

According to a seventh aspect of the present disclosure, there is provided an ingress border node BNi(n) configured to enable nesting of a LSP crossing multiple AS domains without running a RSVP-TE session over inter-domain links, where n is an integer variable that is a number representing a domain being connected for the E2E LSP. In one embodiment, the ingress border node BNi(n) comprises a network communication interface configured to enable communication over a network; memory configured to store data and executable instructions; and a processing unit configured to execute the executable instructions to: receive an ERO containing a path from the ingress border node BNi(n) in a domain(n) to an egress border node BNo(n) in the domain(n), upstream egress node BNo(n−1) information, downstream stitching label (SLk) allocated on BNi(n+1) and downstream stitching interface (if2k), a nesting label (Le) for E2E LSP nesting, and a nesting interface (if2e) as an outgoing interface associated with the nesting label (Le); create an LSP tunnel segment from the ingress border node BNi(n) to the egress border node BNo(n) in the domain(n) using the ERO; obtain a next-hop node label (nhnL) and a next-hop node interface (nhnIf) of a next-hop node (nhn) of the ingress border node BNi(n) along the LSP tunnel segment; allocate an incoming label (SLn) on the ingress border node BNi(n); obtain an incoming interface (if2n) from an upstream egress node BNo(n−1) to the ingress border node BNi(n); and write a cross connect on BNi(n) using SLn as incoming top label, SLk as the label under the top label, if2n as incoming interface, nhnL as outgoing label, and nhnIf as outgoing interface.

In various embodiments of the seventh aspect of the present disclosure, the processing unit may further execute the executable instructions to perform one or more of the following instructions: send a message to the egress border node BNo(n) that comprises the downstream stitching label (SLk) and the downstream stitching interface (if2k) for enabling the egress border node BNo(n) to write a cross connect on the egress border node BNo(n) using the downstream stitching label (SLk) as a second level label and as an outgoing label, and using the downstream stitching interface (if2k) as an outgoing interface configured to stitch the LSP tunnel segment in domain(n) to a downstream LSP tunnel segment in domain(n+1); and send a status of the LSP tunnel segment creation in the domain(n), the incoming label (SLn) as the downstream stitching label (SLk), and the incoming interface (if2n) as the downstream stitching interface (if2k) to a PCE.

According to an eighth aspect of the present disclosure, there is provided an ingress border node BNi(n) configured to enable nesting of a LSP crossing multiple area domains without running a RSVP-TE session over a cross connect on an ABR, where n is an integer variable that is a number representing a domain being connected for the E2E LSP. In one embodiment, the ingress border node BNi(n) comprises a network communication interface configured to enable communication over a network; memory configured to store data and executable instructions; and a processing unit configured to execute the executable instructions to: receive an ERO containing a path from the ingress border node BNi(n) in a domain(n) to an egress border node BNo(n) in the domain(n), a nesting label (Le) for E2E LSP nesting, and a nesting interface (if2e) as outgoing interface associated with the nesting label (Le); create an LSP tunnel segment from the ingress border node BNi(n) to the egress border node BNo(n) in the domain(n) using the ERO; obtain a next-hop node label (nhnL) and a next-hop node interface (nhnIf) of a next-hop node (nhn) of the ingress border node BNi(n) along the LSP tunnel segment; and send a message to the egress border node BNo(n) that comprises the nesting label (Le) and the nesting interface (if2e) for enabling the egress border node BNo(n) to write a cross connect on the egress border node BNo(n) using the nesting label (Le) as a second level label and using the nesting interface (if2e) as outgoing interface configured to stitch the LSP tunnel segment in domain(n) to a downstream LSP tunnel segment in domain(n+1).

In various embodiments of the eighth aspect of the present disclosure, the processing unit may further execute the executable instructions to perform one or more of the following instructions: send a status of the LSP tunnel segment creation in the domain(n), the next-hop node label (nhnL) as the downstream stitching label (SLk), and the next-hop node interface (nhnIf) as the downstream stitching interface (if2k) to a PCE; receive a downstream stitching label (SLk) allocated on the next-hop node (NHo1) of BNo(1) and a downstream stitching interface (if2k); and write a cross connect on BNi(n) using the next-hop node label (nhnL) as top level label, SLk as second level label under the top level label, Le as a third level label, and nhnL as outgoing label, nhnIf as outgoing interface.

It should be understood that embodiments of this disclosure further include various combinations of the items discussed above.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
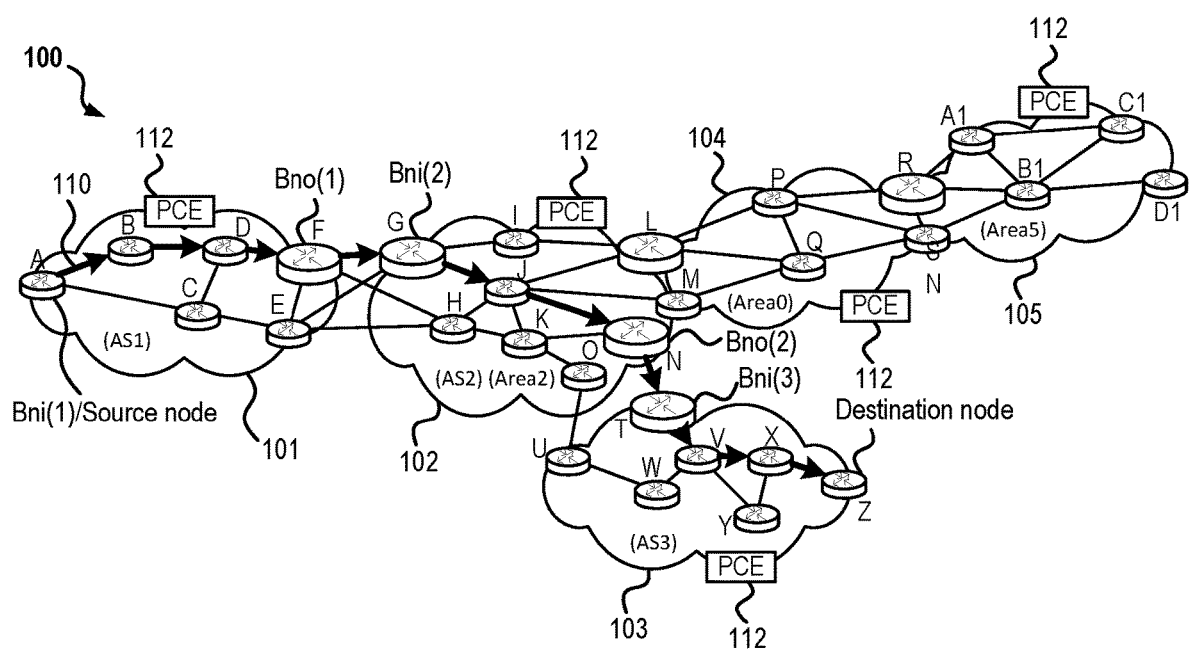
FIG. 1 is a schematic diagram illustrating a network that includes an E2E LSP crossing multiple AS domains connected by inter-domain links in accordance with an embodiment of the present disclosure.

The illustrated figures are only exemplary and are not intended to assert or imply any limitation with regard to the environment, architecture, design, or process in which different embodiments may be implemented. Any optional component or steps are indicated using dash lines in the illustrated figures.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides various embodiments for stitching and/or nesting LSP segments for creating an E2E LSP without running, as is currently necessary, an RSVP-TE session over an inter-domain link. As an example, in one embodiment, extensions to RSVP-TE are disclosed that enable LSP stitching and/or nesting to cross domains without running any RSVP-TE session crossing domains. The present disclosure is applicable to various types of domains including, but not limited to, AS and areas. Advantages of the disclosed embodiments include providing an easy and efficient method for creating E2E LSP, simplifying network operations, and reducing the cost of network Operations, Administration, and Maintenance (OAM).

In accordance with the various embodiments in the present disclosure, an inter-domain link is a connection that connects two domains. A domain is a collection of network devices that are administered as a unit with common rules and procedures. One type of domain is an AS, which is a collection of Internet Protocol (IP) network devices such as routers whose routing prefixes and routing policies are under common administrative control. An AS is assigned a globally unique number, sometimes called an Autonomous System Number (ASN). An AS is also sometimes referred to as a routing domain. Networks devices within an autonomous system communicate routing information to each other (intra-AS routing) using an Interior Gateway Protocol (IGP) such as the Open Shortest Path First (OSPF) protocol. Exterior Gateway Protocols (EGPs) are inter-AS routing protocols used to distribute routing information between autonomous systems (ASes). For example, an autonomous system may share routing information with other autonomous systems using the Border Gateway Protocol (BGP). BGP is a standardized EGP designed to exchange routing and reachability information among ASes on the Internet. ASes are interconnected by a router called an Autonomous System Border Router (ASBR).

In OSPF, a single AS can be divided into smaller domains called areas. This reduces the number of link-state advertisements (LSAs) and other OSPF overhead traffic sent on the network. It also reduces the size of the topology database that each router must maintain. Areas are identified by uniquely assigned numbers and an AS must define at least one area. Thus, an area is a logical collection of OSPF networks, routers, and links that have the same area identification. When an AS is divided into multiple areas, the areas are interconnected by a router called an Area Border Router (ABR).

To route traffic along specified paths through the network, a network operator may establish an LSP, which is a unidirectional path or tunnel through a Multiprotocol Label Switching (MPLS) network. LSPs may be established for a variety of other reasons such as, but not limited to, creating network-based IP virtual private networks. An LSP may be created using a signaling protocol such as LDP (Label Distribution Protocol), RSVP-TE, BGP, or Constraint-based Routing Label Distribution Protocol (CR-LDP). RSVP is a transport layer protocol designed to reserve resources across a network. For example, RSVP may be used to reserve bandwidth along a path from a specific source to destination. RSVP-TE is used to establish MPLS transport LSPs when there are traffic engineering requirements. It is mainly used to provide Quality of service (QoS) and load balancing across the network core.

MPLS is a type of data-carrying technique for high-performance telecommunications networks. MPLS directs data from one network node to the next based on short path labels rather than long network addresses, avoiding complex lookups in a routing table. MPLS works by prefixing packets with an MPLS header, containing one or more labels. The labels identify virtual links (paths) between distant nodes rather than endpoints. MPLS can encapsulate packets of various network protocols, hence its name "multiprotocol." MPLS-TE is used to avoid packet drops due to inefficient use of available bandwidth and to provide better performance. TE is employed to steer some of the traffic destined to follow the optimal path to a suboptimal path to enable better bandwidth management and utilization between a pair of routers. Thus, TE relieves temporary congestion in the core of the network on the primary or optimal cost links.

An MPLS-TE LSP may be created from a number of different LSP segments using LSP stitching. LSP stitching is a process of connecting LSP segments together in a data plane in such a way that a single end-to-end LSP is realized in the data plane. Additionally, to improve scalability of MPLS, it may be useful to aggregate LSPs by creating a hierarchy of such LSPs using LSP nesting. LSP nesting is the carrying of one MPLS-TE LSP within another MPLS-TE LSP (i.e., tunnel multiple RSVP LSPs over a single RSVP LSP).

As stated above, currently, for an E2E LSP crossing multiple domains to be able to stitch or nest two segments of the LSP in two adjacent domains, such as ASes connected by an inter-AS link using existing MPLS-TE, an RSVP-TE session must be running over the inter-AS link. An RSVP-TE session is a communication adjacency between two routers over which the RSVP packets for establishing an LSP are exchanged. Running an RSVP-TE session over the inter-AS link increases the complexity and cost of network operations. Accordingly, the present disclosure provides various embodiments for stitching and/or nesting LSP segments for creating an E2E LSP without running, an RSVP-TE session over an inter-domain link.

Referring now to the drawings, FIG. 1 illustrates a network 100 in which an E2E LSP 110 is depicted in accordance with an embodiment of the present disclosure. The network 100 includes five domains, domain 101, domain 102, domain 103, domain 104, and domain 105. In the depicted embodiment, domain 101, domain 102, and domain 103 are ASes, and respectively labeled AS1, AS2, and AS3. Domain 104 and domain 105 are areas respectively labeled Area 0 and Area 5. Domain 102 also includes an area labeled Area 2. The domain containing the source node is referred to as the source domain. The domain containing the destination node is referred to as the destination domain. Additionally, as referenced herein, the term "downstream" means in the direction away from the source node and towards the destination node; and the term "upstream" means in the direction away from the destination node and towards the source node. For ease of simplicity, in the depicted embodiment, the E2E LSP 110 that connects a source node (node A) located in domain 101 with a destination node (node Z) located in domain 103 only crosses three ASes (domain 101, domain 102, and domain 103). However, it should be appreciated that the disclosed embodiments are applicable for use with any number of domains (e.g., AS1, AS2 ..., ASn).

As shown in FIG. 1, there are two border nodes in each of the ASes along the E2E LSP 110. The first is an inbound/ingress ASBR from which the LSP goes into the AS (labeled BNi(n) for ingress border node, where n is an integer variable that is a number representing the domain being connected by the E2E LSP 110, starting with 1 for the source domain, 2 for next domain downstream from the source domain along the E2E LSP 110, and so on). The second node in the AS is an outbound/egress ASBR (labeled BNo(n)) from which the E2E LSP 110 goes out of the AS. For instance, in the depicted embodiment, the ingress border node for the E2E LSP 110 in the first domain (BNi(1)) is the source node. BNo(1) in AS1 is node F. BNi(2) in AS2 is node G and BNo(2) in AS2 is node N. BNi(3) in AS3 is node T and BNo(3) in AS3 is destination node Z. The E2E LSP 110 ends at the destination node Z.

Additionally, in certain embodiments, each of the domains may also include a PCE 112. PCE 112 is an entity (component, application, or network node) that is capable of computing a network path or route based on a network graph and applying computational constraints. The PCE 112 may be configured to communicate path or route information with a Path Computation Client (PCC) running on one or more of the nodes in the AS or other domains, and/or with the PCE 112 in other domains.

In accordance with various embodiments, two new bits (or flags) are introduced. The first is a stitching bit/flag (S) and the second is a nesting bit/flag (N). These two bits may be defined in a SESSION_ATTRIBUTE OBJECT of a PATH message (as defined by RSVP-TE) for enabling stitching and/or nesting of LSP segments for creating the E2E LSP 110 without running an RSVP-TE session over an inter-domain link. A PATH message is a message sent by a head end router requesting that resources be reserved along a path from the head end router to a tail end router. The PATH message is forwarded through the network from head end router towards the tail end router. The SESSION_ATTRIBUTE OBJECT contains attributes of the session such as a Tunnel Destination IP address, Tunnel ID, and Tunnel Source IP address. As an example, setting stitching bit S to one (S=1) may be used to indicate that the E2E LSP perform LSP stitching without session crossing domains. Similarly, setting nesting bit N to one (e.g., N=1) may be used to indicate that the E2E LSP perform LSP nesting without session crossing domains.

In one embodiment, when an ingress border node of an LSP segment sets S=1, it adds a stitching label (SL) and a stitching interface (SI) into the PATH message for the E2E LSP 110, which is sent hop by hop to the destination node of the E2E LSP 110 segment. Similarly, when an ingress border node of an E2E LSP 110 segment sets N=1, it adds nesting label (NL) and nesting interface (NI) into the PATH message for the E2E LSP 110, which is sent hop by hop to the destination node of the E2E LSP 110 segment.

Additionally, in accordance with an embodiment, two new C-Types of Record-Route objects (RROs) may be defined, one for the stitching label and stitching interface SL and SI, and a second one for the nesting label and nesting interface NL and NI. As an example, a first RRO with Class=21, C-Type=3 may be defined for SL and SI. A second RRO with Class=21, C-Type=4 may be defined for NL and NI. In one embodiment, the first RRO contains SL and SI subobjects, including the stitching label and IP address of the stitching interface respectively. In one embodiment, the stitching label and IP address of the stitching interface have the same formats as MPLS label and IP address subobjects. The second RRO contains NL and NI subobjects, including the nesting label and IP address of the nesting interface respectively.

In accordance with various embodiments, as will be further described, for E2E LSP 110 a stitching label SL(n) is allocated on each BNi(n) for each of the ASes (excluding the source node). The stitching label SL(n) with a stitching interface SI(n) associated with SL(n) may be sent from BNi(n) of AS(n) to an upstream ingress border node BNi (n−1) that is located in an adjacent upstream domain AS(n−1) along the E2E LSP 110. The BNi(n−1) sends the SL(n) and the SI(n) to the egress border node BNo(n−1) of AS(n−1). In one embodiment, this may be done using RSVP-TE. The BNo(n−1) stitches the LSP segment in AS(n−1) to the LSP segment in AS(n) using the stitching label SL(n) and the stitching interface SI(n). In various embodiments, the disclosed stitching or nesting process for creating the E2E LSP 110 begins with the ingress border node in the destination domain (e.g., BNi(3)) and works its way serially backwards through the intermediate domains (e.g., AS2) and finally back to the source node (BNi(1)) in the source domain AS1 to complete the E2E LSP 110.

For example, in FIG. 1, for E2E LSP 110 from A to Z, crossing AS1, AS2 and AS3, a stitching label SL(3) is allocated on node T (i.e., BNi(3)). SI(3) is the interface from node N (BNo(2)) to node T (BNi(3)) and is the stitching interface associated with stitching label SL(3). SL(3) with SI(3) may be sent to node G (BNi(2)) using a PCC running on BNi(3) that communicates with PCE 112 of AS2 via PCE 112 of AS3. Node G (BNi(2)) may then send SL(3) and SI(3) to node N (BNo(2))=N. Node N (BNo(2)) stitches the LSP segment in AS2 to the LSP segment in AS3 using SL(3) and SI(3).

Figure 2A:
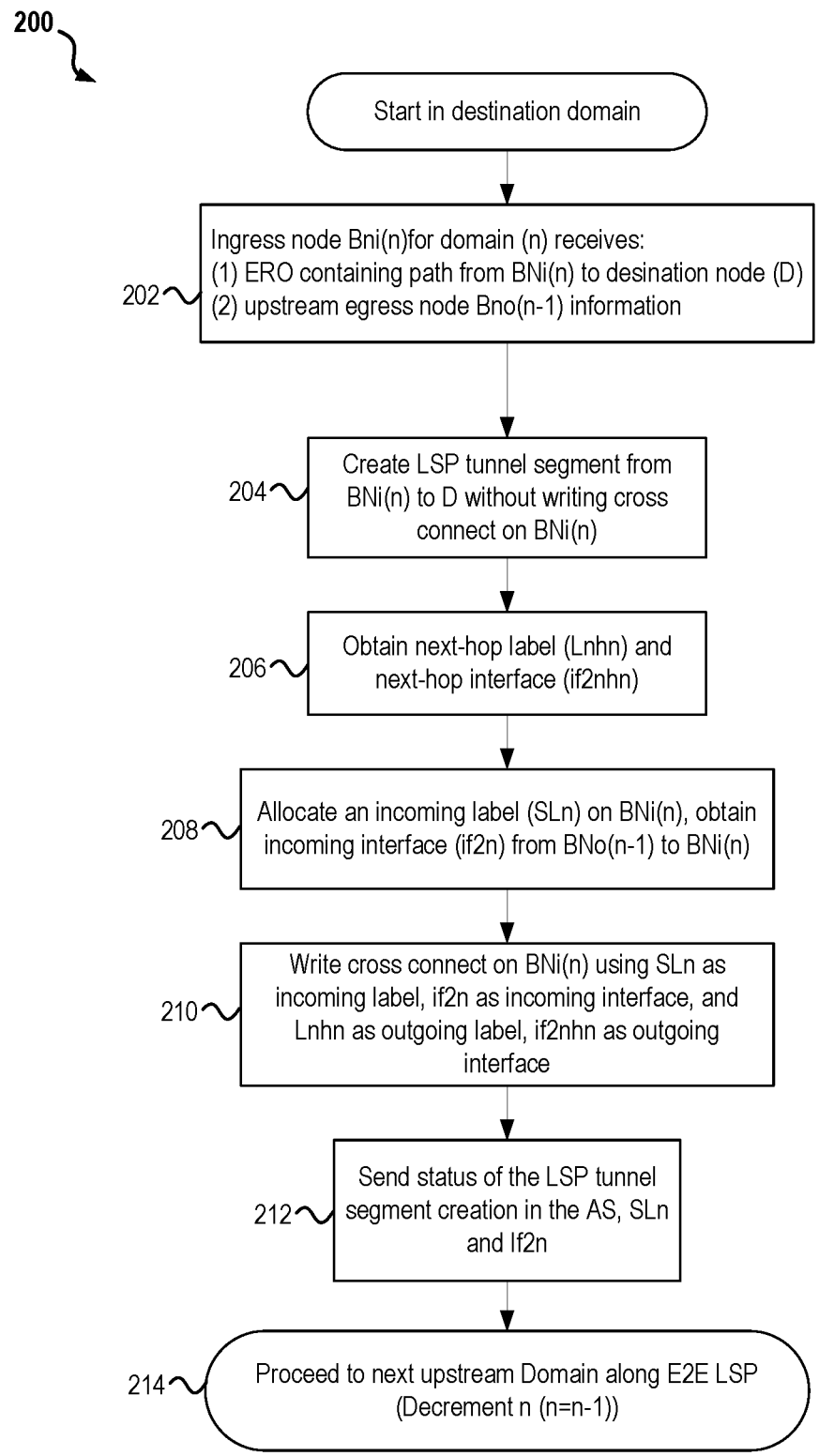
FIGS. 2A-2C are flowcharts illustrating a method for stitching LSP tunnel segments of AS domains for forming an E2E LSP without running an RSVP-TE session over inter-domain links in accordance with an embodiment of the present disclosure.
Figure 2B:
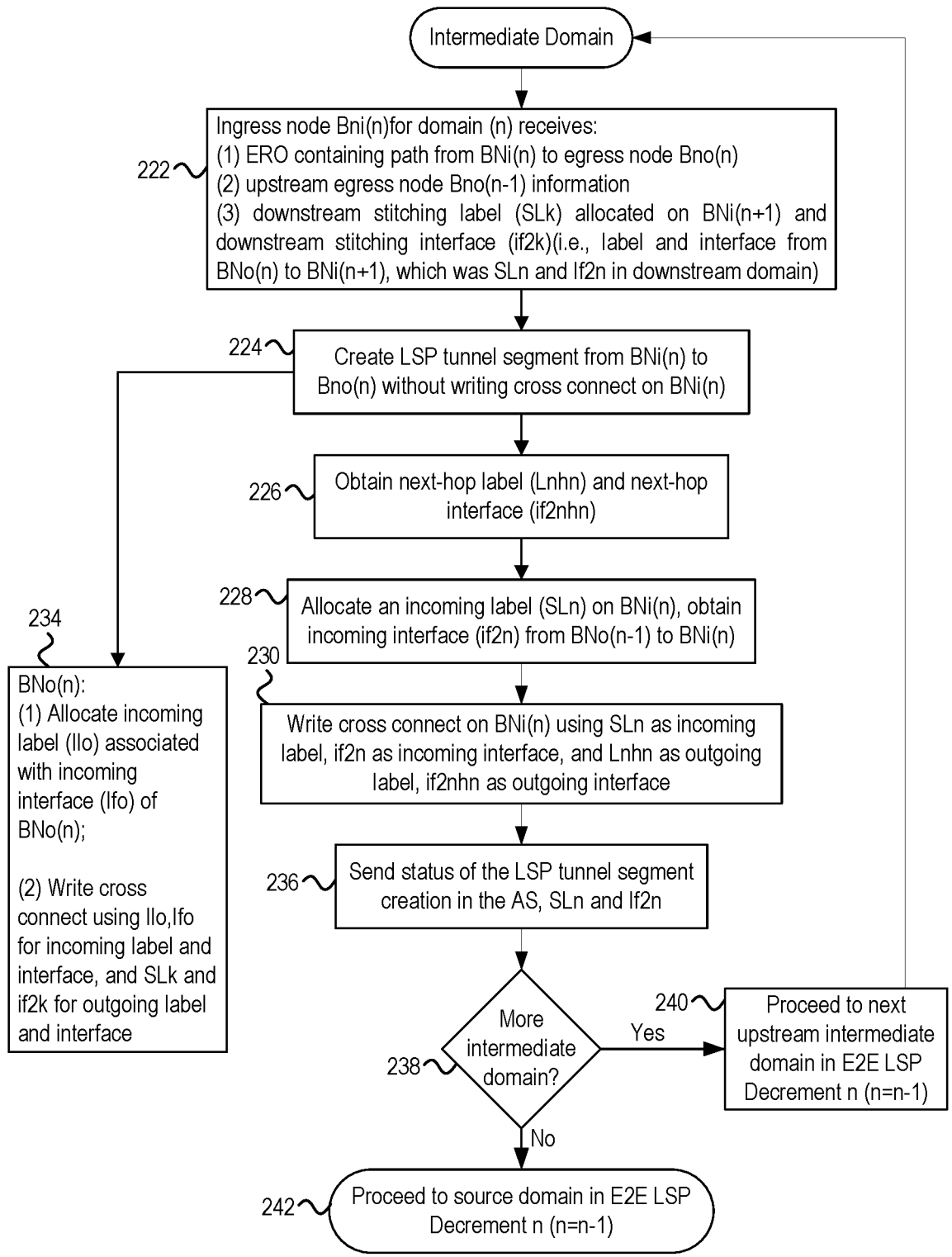
Figure 2C:
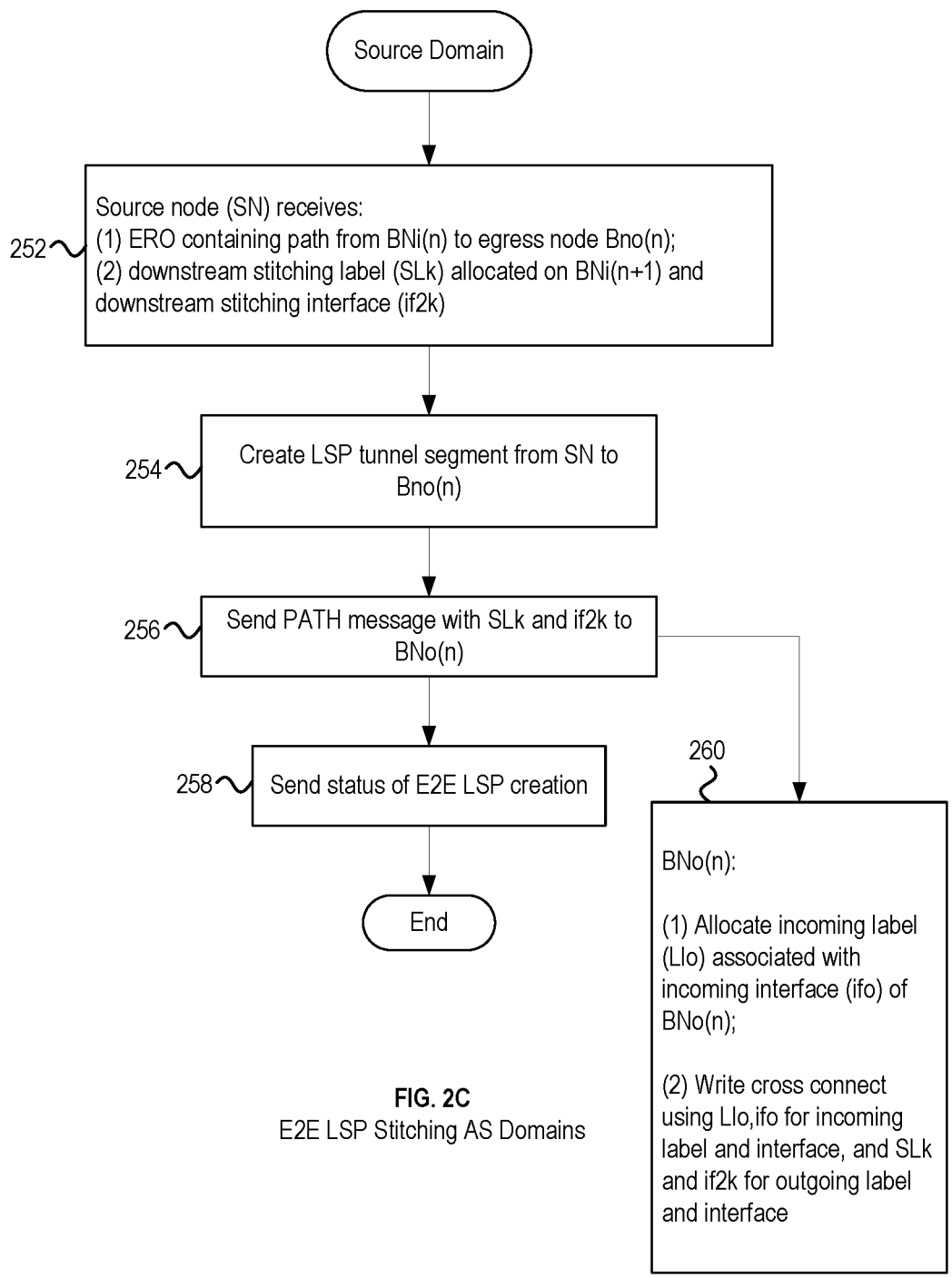

FIGS. 2A-2C are flowcharts illustrating a method 200 for stitching LSP tunnel segments of AS domains for forming an E2E LSP without running RSVP-TE session over inter-AS links in accordance with an embodiment. As will be described, portions of the method 200 are performed by an ingress border node BNi of each AS domain of the E2E LSP, starting with the ingress border node in the destination AS domain. For example, FIG. 2A describes the portion of the method 200 for forming an E2E LSP without running RSVP-TE session over inter-AS links that is performed by an ingress border node in a destination AS domain containing a destination node or end node of the E2E LSP. FIG. 2B describes the portion of the method 200 for forming the E2E LSP without running RSVP-TE session over inter-AS links that is performed by an ingress border node in the intermediate AS domain located between the destination domain and a source domain containing a source node or beginning node of the E2E LSP. FIG. 2C describes the portion of the method 200 for forming the E2E LSP without running RSVP-TE session over inter-AS links that is performed by the source node in the source AS domain. In one embodiment, the source node, ingress border node BNi, and destination node that perform the method illustrated in FIGS. 2A-2C may be implemented using an apparatus as described in FIG. 7.

Starting with FIG. 2A, the method 200 begins, at step 202, with the ingress border node BNi(n) in the destination AS domain receiving information associated with the egress border node in adjacent upstream AS domain (i.e., BNo(n−1)) that includes an incoming interface from BNo(n−1) to BNi(n). The ingress border node BNi(n) also receives an Explicit Route Object (ERO) containing path information from BNi(n) to destination D. In one embodiment, a PCC running on BNi(n) may receive the above information from a PCE.

At step 204, the BNi(n) creates an LSP tunnel from BNi(n) to D along the path using information from the ERO without writing a cross connect on BNi(n). In one embodiment, the LSP tunnel may be established using RSVP-TE. At step 206, the BNi(n) obtains the label (nhnL) from the next-hop node of BNi(n) and the interface (nhnIf) from BNi(n) to the next-hop node. In one embodiment, this may be performed using information contained in a reservation request (Resv) message from the next-hop node. A Resv message is used to reserve resources for along a route and may contain the data flow specifications.

At step 208, the BNi(n) allocates (binds) an incoming label SLn on BNi(n), and obtains the incoming interface if2$n$ (i.e., the upstream incoming interface) from BNo(n−1) to BNi(n). The BNi(n), at step 210, writes a cross connect on BNi(n) using SLn as incoming label, if2$n$ as incoming interface, and nhnL as outgoing label, and nhnIf as outgoing interface. At step 212, the BNi(n) in the destination AS sends the status of the LSP tunnel segment creation in the destination AS, the SLn and the if2$n$. In one embodiment, the BNi(n) sends this information to a PCE via a PCC running on BNi(n). The method 200, at step 214, then proceeds to the adjacent upstream AS domain from the current AS along the E2E LSP. The method 200 decrements the value of n by one (e.g., n=n−1) to make n coincide with the adjacent upstream AS domain.

In the intermediate domain, as depicted in FIG. 2B, the BNi(n) of the intermediate domain(n) receives, at step 222, information associated with the egress border node in adjacent upstream AS domain (i.e., BNo(n−1)) from that of the intermediate domain(n) that includes an incoming interface from BNo(n−1) to BNi(n). BNo(n−1) is the egress border node of an LSP tunnel segment in the upstream AS and is connected to BNi(n) by an inter-AS link. The ingress border node BNi(n) of the intermediate domain(n) also receives an ERO containing a path from BNi(n) to BNo(n). BNo(n) is the egress border node of the LSP tunnel segment in the current intermediate AS. The BNi(n) of the intermediate domain(n) also receives a downstream stitching label SLk and corresponding interface if2$k$. SLk is the stitching label allocated on BNi(n+1), which is the ingress border node in the adjacent downstream domain along the E2E LSP. If2$k$ is the interface from BNo(n) to BNi(n+1). In one embodiment, a PCC running on the BNi(n) of the intermediate domain(n) receives the above information from a PCE of the intermediate domain(n).

At step 224, the BNi(n) creates an LSP tunnel segment from BNi(n) to BNo(n) along the path using information from the ERO without writing a cross connect on BNi(n) through sending a PATH message with SLk and if2$k$ to BNo(n) along the path. After receiving a PATH message for the LSP tunnel segment, the BNo(n) (i.e., the egress border node in the intermediate AS), at step 234, allocates an incoming label (Llo) associated with an incoming interface (ifo) on the BNo(n). The BNo(n) writes a cross connect on BNo(n) using the label Llo as incoming label, the interface ifo as incoming interface, and SLk as outgoing label, if2$k$ as outgoing interface. This step connects/stitches the LSP tunnel segment in the intermediate AS to the LSP tunnel segment in the adjacent downstream AS.

At step 226, the BNi(n) obtains the label (nhnL) from the next-hop node of BNi(n) and the interface (nhnIf) from BNi(n) to the next-hop node. In one embodiment, BNi(n) obtains this information from a Resv message from the next-hop node.

At step 228, the BNi(n) allocates an incoming label SLn on BNi(n), and obtains the incoming interface if2$n$ from BNo(n−1) to BNi(n). The BNi(n), at step 230, writes a cross connect on BNi(n) using SLn as incoming label, if2$n$ as incoming interface, and nhnL as outgoing label, and nhnIf as outgoing interface.

At step 236, the BNi(n) in the intermediate AS sends the status of the LSP tunnel segment creation in the intermediate AS, the SLn, and the if2$n$. In one embodiment, the BNi(n) sends this information to a PCE via a PCC running on BNi(n).

At step 238, the method determines if the adjacent upstream AS domain(n−1) along the E2E LSP is also an intermediate domain between the source domain and the destination domain. If the adjacent upstream AS domain(n−1) along the E2E LSP is also an AS intermediate domain, the method proceeds to the adjacent upstream AS domain(n−1) along the E2E LSP, at step 240, decrements the value of the variable n and repeats the process of FIG. 2B for each intermediate AS domain between the source AS domain and the destination AS domain. If the adjacent upstream AS domain(n−1) along the E2E LSP is not an intermediate AS domain, the method 200, at step 242, decrements the value of the variable n, and proceeds to the process illustrated in FIG. 2C for the source domain.

In the source domain, as depicted FIG. 2C, at step 252, the source node, which is the BNi(n) for the source domain, receives an ERO containing path from source node to BNo(1). The source node also receives downstream stitching label (SLk) allocated on BNi(n+1) (i.e., BNi(2)) and corresponding downstream stitching interface (if2$k$). In one embodiment, the above information may be received from a PCC running on the source node, which receives a message from a PCE containing this input.

At step 254, the source node creates an LSP tunnel from the source node to BNo(1) along the path. In one embodiment, the LSP tunnel may be established using RSVP-TE. At step 256, the source node sends a PATH message with the downstream stitching label (SLk) and the corresponding downstream stitching interface (if2k) to BNo(1).

After receiving the PATH message for the LSP tunnel segment, the BNo(1), at step 260, allocates an incoming label (Llo) associated with incoming interface (ifo). The BNo(1) writes a cross connect on BNo(1) using the label Llo as the incoming label, the interface ifo as incoming interface, and downstream stitching label (SLk) as outgoing label, and the corresponding downstream stitching interface (if2k) as outgoing interface. This step connects/stitches the LSP tunnel segment in the source domain to LSP tunnel segment in the adjacent downstream domain, thus completing an E2E LSP that crosses AS domains without having to run an RSVP-TE session over an inter-domain link. At step 258, the source node sends the status of the LSP tunnel segment creation in the source AS domain and the status of the creation of the E2E LSP crossing AS domains. In one embodiment, the source node sends the status information to a PCE via a PCC running on the source node, with the method 200 terminating thereafter. Accordingly, the above process describes one embodiment for creating an E2E LSP crossing AS domains without having to run an RSVP-TE session over an inter-domain link. A similar process may be applied for creating an E2E LSP crossing area domains without having to run an RSVP-TE session over an inter-domain link as described below.

Figure 3:
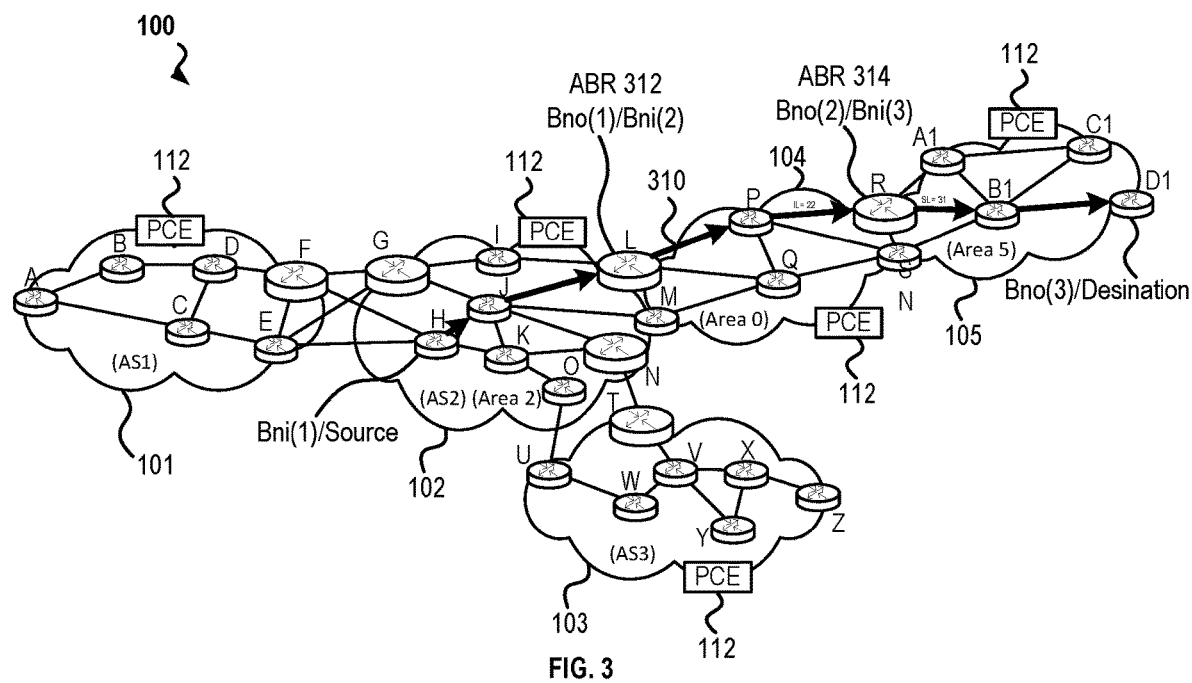
FIG. 3 is a schematic diagram illustrating a network that includes an E2E LSP crossing multiple area domains connected by ABRs in accordance with an embodiment of the present disclosure.

FIG. 3 illustrates an E2E LSP 310 from a source node H to a destination node D1 that crosses three areas (area 2 of domain 102, area 0 of domain 104, and area 5 of domain 105) in the network 100, although the disclosed embodiments may be applied to any number of area/domains. The three areas are communicatively coupled via ABR 312 and ABR 314. The ABR 312 and ABR 314 each have different OSPF interfaces that are attached to the different OSPF areas so that it can operate in more than one area. The ABR 312 and ABR 314 each maintain a copy of a link-state database for each attached area. Similar to AS domains, there are two nodes in each area domain(n) along the E2E LSP 310. The first node is the ingress border node from which the E2E LSP 310 goes into the area, the second node is the egress border node from which the E2E LSP 310 goes out of the area. The ingress border node is labeled as BNi(n), the egress border node as BNo(n), where n is an integer variable that is a number representing the area being connected by the E2E LSP 310, starting with 1 for the source area, 2 for next area downstream from the source area along the E2E LSP 310, and so on. As shown in FIG. 3, for areas, an egress border node or ABR of an upstream area domain (i.e., BNo(n)) is the same node as an ingress border node of a downstream node (i.e., BNi(n+1)) because the same ABR connects an upstream area to an adjacent downstream area. For example, for E2E LSP 310 crossing area 2, area 0, and area 5 in FIG. 3, the E2E LSP 310 begins at BNi(1), which is the source node H, and exits area 2 at BNo(1), which is node L, also labeled as ABR 312. ABR 312 is also the ingress border node BNi(2) in the intermediate area (area 0). The E2E LSP 310 exits area 0 at BNo(2), which is node R, also labeled as ABR 314. ABR 314 is also the ingress border node BNi(3) in area 5, which is the destination area in the depicted example. The E2E LSP 310 connects ABR 314 in area 5 to the destination node D1.

In one embodiment, for an E2E LSP crossing domains that are areas, there is a stitching label SL(n) allocated on the next-hop node of each BNi(n) except for the source node. The stitching interface SI(n) associated with SL(n) is the interface from BNi(n) to the next-hop node. The stitching label SL(n) along with the stitching interface SI(n) may be sent to an upstream ingress border node BNi(n−1), which may send it to its egress border node BNo(n−1). In one embodiment, the stitching label SL(n) along with the stitching interface SI(n) may be sent through RSVP-TE. As described above, the egress border node BNo(n−1) in the upstream area is the same node as the ingress border node BNi(n) of the downstream area. BNo(n−1) stitches the LSP segment in its area(n−1) to the LSP segment in area(n) using the stitching label SL(n) along with the stitching interface SI(n).

As an example, in FIG. 3, for E2E LSP 310 from source node H to destination node D1, beginning in the destination domain, a stitching label SL(3)=31 may be allocated on the next-hop node B1 of BNi(3). An interface SI(3) from BNo(2)/ABR 314 to node B1 is the stitching interface associated with stitching label SL(3). The stitching label SL(3) along with interface SI(3) may be sent to BNi(2)/ABR 312. The BNi(2) then sends stitching label SL(3) along with interface SI(3) to BNo(2)/ABR 314. BNo(2)/ABR 314 stitches the LSP segment in area 0 to the LSP segment in area 5 using SL(3)=31 and SI(3) from BNo(2)/ABR 314 to node B1. In the depicted embodiment, suppose that the incoming label allocated on BNo(2)/ABR 314 (also labeled as node R) for the LSP segment is 22, and its associated interface P-R is the one from node P to node R, then the forwarding entry that node R creates for stitching is for a packet with label 22 from interface P-R, node R swaps label 22 with stitching label SL(3)=31 and sends the packet to interface SI(3).

Figure 4A:
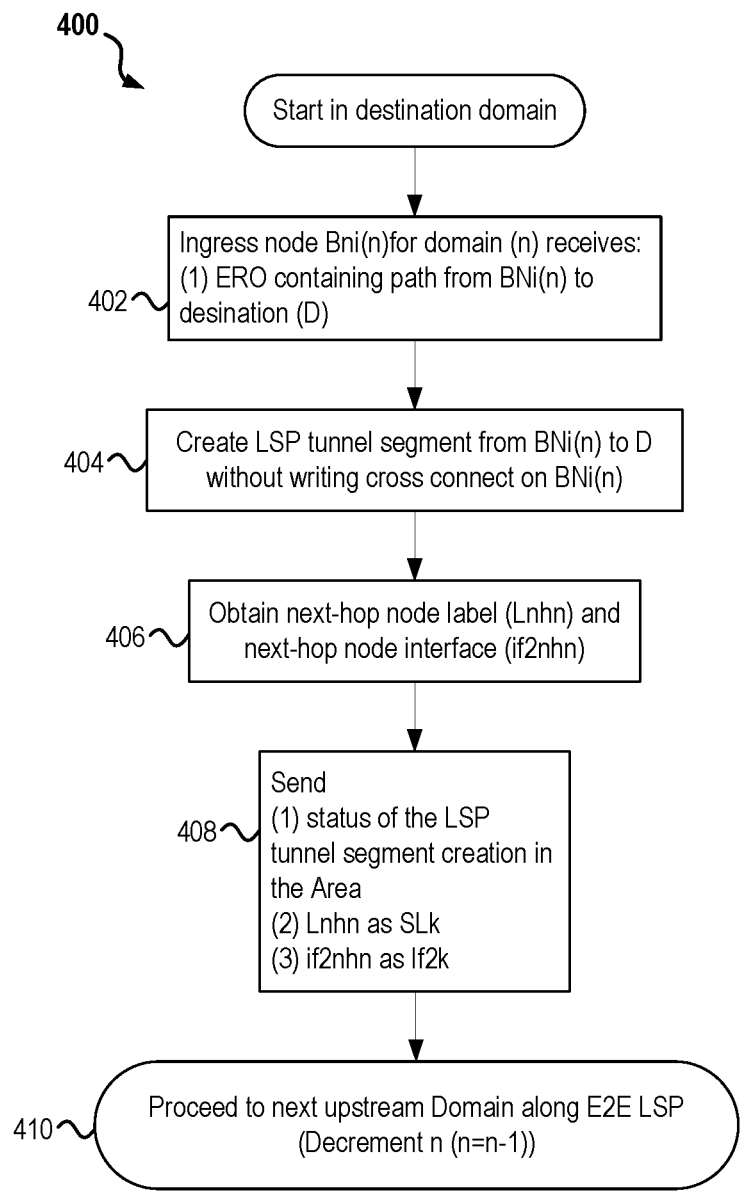
FIGS. 4A-4C are flowcharts illustrating a method for stitching LSP tunnel segments across area domains for forming an E2E LSP without running an RSVP-TE session over a cross connect on an ABR in accordance with an embodiment of the present disclosure.
Figure 4B:
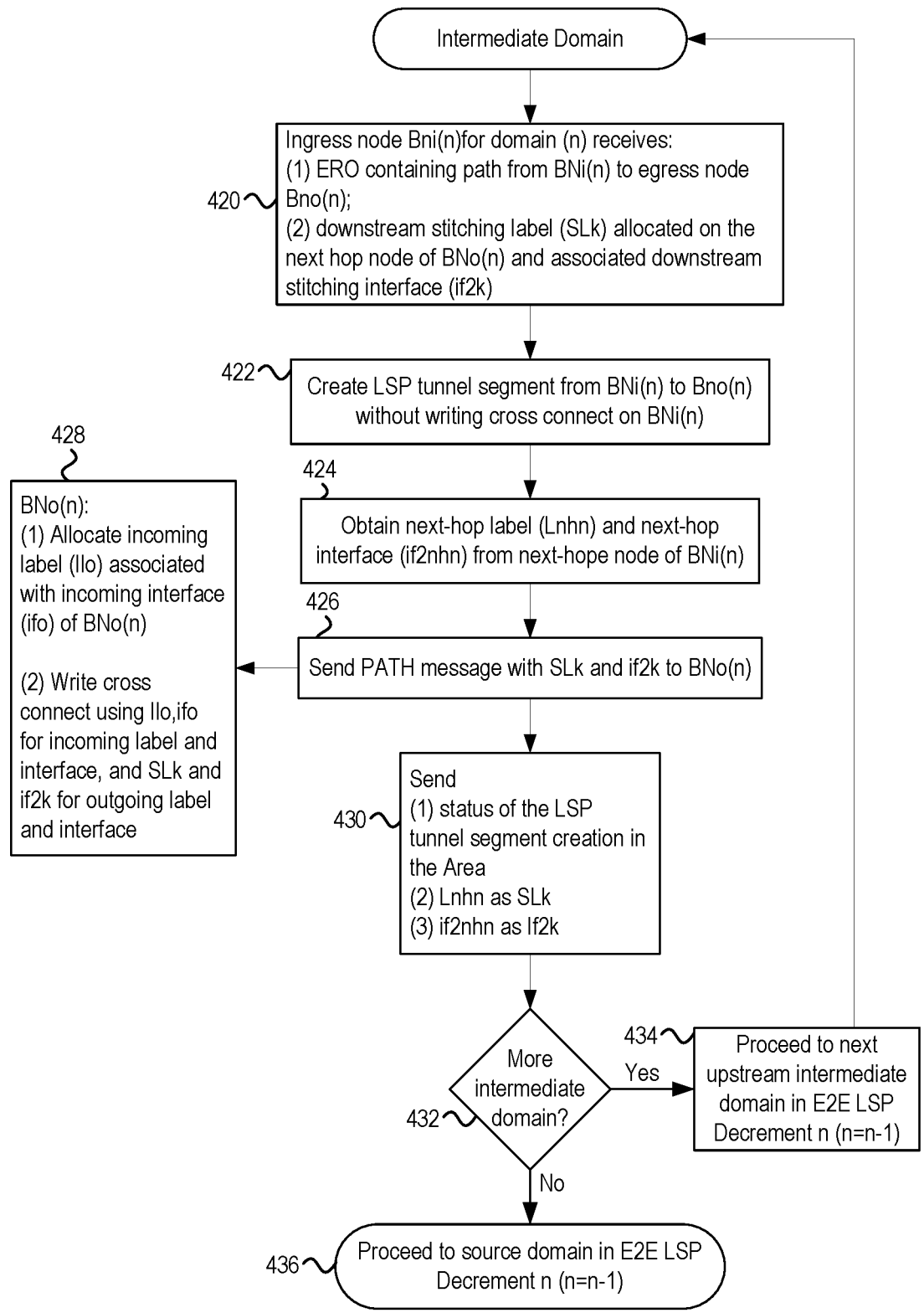
Figure 4C:
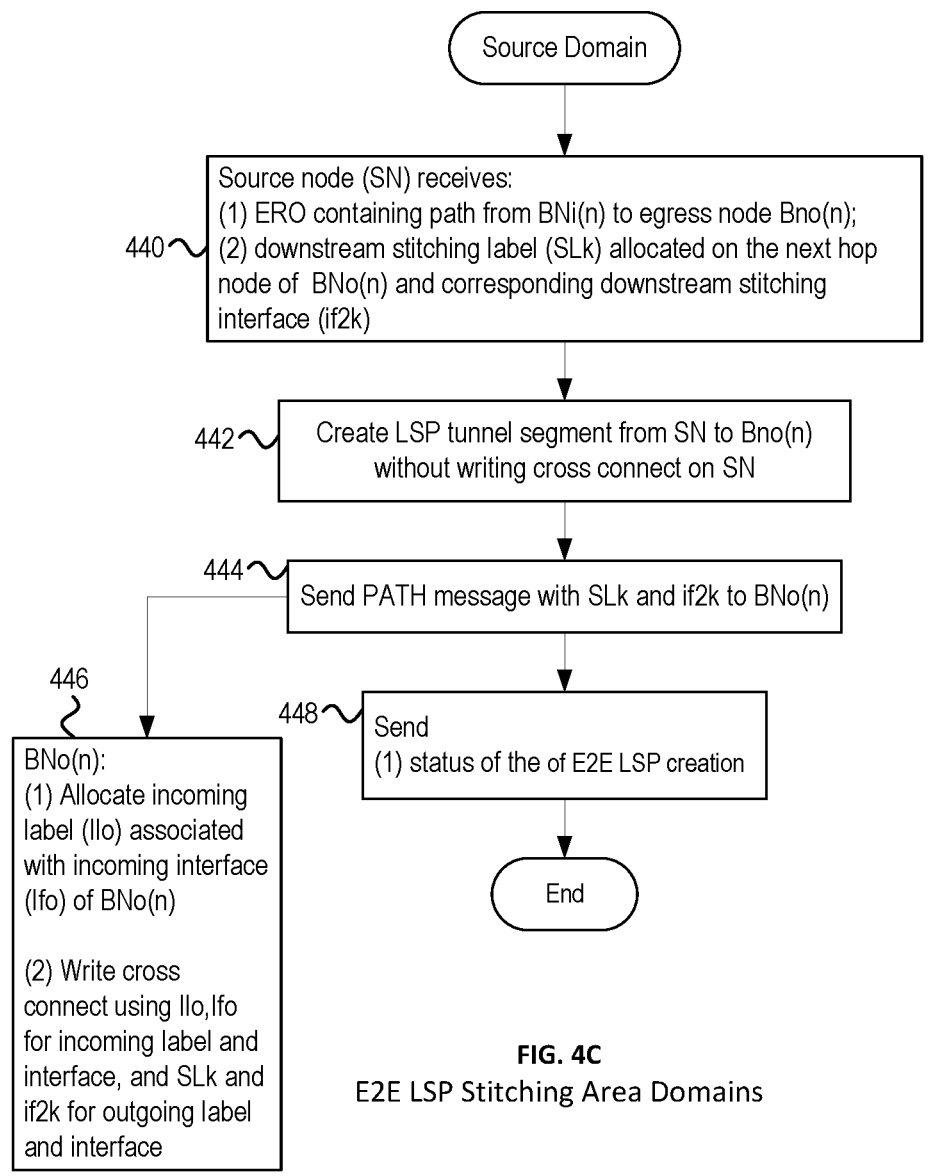

For a more detail explanation, FIGS. 4A-4C are flowcharts illustrating a method 400 for stitching LSP tunnel segments across area domains for forming an E2E LSP without running RSVP-TE session over a cross connect on an ABR in accordance with an embodiment. Similar to the process for stitching LSP tunnel segments in ASes, the method 400 for stitching LSP tunnel segments in areas begins with the ingress border node/ABR in the destination area domain and works its way serially backwards through the intermediate area domains and finally back to the source node in the source area domain to complete the E2E LSP. As will be described, portions of the method 400 are performed by an ingress border node/ABR of each area domain of the E2E LSP. For example, FIG. 4A describes the portion of the method 400 for forming the E2E LSP without running RSVP-TE session over a cross connect on an ABR that is performed by an ingress border node/ABR in a destination area domain containing a destination node or end node of the E2E LSP. FIG. 4B describes the portion of the method 400 for forming the E2E LSP without running RSVP-TE session over a cross connect on an ABR that is performed by an ingress border node/ABR in the intermediate area domain located between the destination area domain and a source area domain containing a source node or beginning node of the E2E LSP. FIG. 4C describes the portion of the method 400 for forming the E2E LSP without running RSVP-TE session over a cross connect on an ABR that is performed by the source node in the source area domain. In one embodiment, the source node, ingress border node/ABR, and destination node that perform the method illustrated in FIGS. 4A-4C may be implemented using an apparatus as described in FIG. 7.

Beginning in FIG. 4A, the BNi(n), at step 402, in the destination area domain receives an ERO containing information about the path from BNi(n) to a destination node D. In one embodiment, the ERO may be received from a PCC running on BNi(n), which receives a message from a PCE containing this information. As described above in FIG. 3, the ingress border node BNi(n) in domain(n) is the same ABR as the egress border node BNo(n−1) in upstream domain(n−1).

At step 404, the BNi(n) creates an LSP tunnel segment from BNi(n) to D using the information from the ERO without writing a cross connect on BNi(n). In one embodiment, the LSP tunnel segment from BNi(n) to D is set up using RSVP-TE. At step 406, the BNi(n) obtains the label nhnL from the next-hop node of BNi(n) and the interface nhnIf from BNi(n) to the next-hop node. In one embodiment, the label nhnL and the interface nhnIf is obtained in a Resv message for the LSP segment from the next-hop node. At step 408, the BNi(n) sends the status of the LSP tunnel segment creation in the destination area domain, label nhnL as SLk, and interface nhnIf as if2$k$. In one embodiment, the BNi(n) sends the preceding information to a PCE via a PCC running on BNi(n). At step 410, the method 400 proceeds to next upstream domain along the E2E LSP. The process decrements the value of n (e.g., n=n−1) to advance to the upstream domain.

In the intermediate domain, as depicted in FIG. 4B, the BNi(n) at step 420 receives the ERO containing a path from BNi(n) to BNo(n), and a downstream stitching label (SLk) allocated on the next-hop node of BNo(n) and associated downstream stitching interface (if2$k$). BNi(n) is the ingress border node of the intermediate domain and BNo(n) is the egress border node of the LSP tunnel segment in the intermediate area. BNi(n) is also the egress border node of an LSP tunnel segment in the upstream area and BNo(n) is also the ingress border node of an LSP tunnel segment in the downstream area. SLk is the stitching label allocated on the next-hop node NHoi of BNo(n). If2$k$ is the interface from BNo(n) to NHoi. In one embodiment, the above information may be received in a message from a PCE via a PCC running on BNi(n).

At step 422, the BNi(n) creates an LSP tunnel segment from BNi(n) to BNo(n) using information from the ERO without writing a cross connect on BNi(n). In one embodiment, the LSP tunnel segment is set up using RSVP-TE. At step 424, the BNi(n) obtains the label nhnL from the next-hop node NHi of BNi(n) and the interface nhnIf from BNi(n) to NHi. In one embodiment, nhnL and nhnIf may be obtained in a Resv message for the LSP segment from NHi. At step 426, the BNi(n) sends a PATH message with SLk and if2$k$ to BNo(n).

After receiving the PATH message for the LSP tunnel segment, the BNo(n) at step 428 allocates an incoming label (Llo) associated with an incoming interface (ifo). The BNo(n) writes a cross connect on BNo(n) using the label Llo as incoming label, the interface ifo as incoming interface, and SLk as outgoing label, if2$k$ as outgoing interface.

At step 430, the BNi(n) then sends the status of the LSP tunnel segment creation in the intermediate area, label nhnL as SLk, and interface nhnIf as if2$k$. In one embodiment, the preceding information may be sent to a PCE via a PCC running on BNi(n).

At step 432, the method 400 determines if the adjacent upstream area domain(n−1) along the E2E LSP is also an intermediate domain between the source domain and the destination domain. If the adjacent upstream area domain (n−1) along the E2E LSP is an intermediate domain, the method 400 proceeds to the adjacent upstream area domain (n−1) along the E2E LSP, at step 434, decrements the value of the variable n, and repeats the process of FIG. 4B for the adjacent upstream intermediate area domain. If the adjacent upstream area domain(n−1) along the E2E LSP is not an intermediate domain, the method 400, at step 436, decrements the value of the variable n, and proceeds to the process illustrated in FIG. 4C for the source domain.

In FIG. 4C, once the method 400 reaches the source area domain, the source node, at step 440, receives an ERO containing a path from the source node to BNo(1), downstream stitching label (SLk) allocated on the next-hop node of BNo(n), and the corresponding downstream stitching interface (if2$k$). BNo(1) is the egress border node/ABR for the LSP tunnel segment in the source area. BNo(1) also connects to the LSP tunnel segment in the downstream area along the E2E LSP. SLk is the stitching label allocated on the next-hop node NHo1 of BNo(1). If2$k$ is the interface from BNo(1) to NHo1. In one embodiment, the above information may be received in a message from a PCE via a PCC running on the source node.

At step 442, the source node creates an LSP tunnel segment from the source node (SN) to BNo(1) using the ERO. In one embodiment, the LSP tunnel segment from the source node to BNo(1) is set up using RSVP-TE. At step 444, the BNi(n) sends a PATH message with SLk and if2$k$ to BNo(1).

At step 446, the BNo(n) after receiving the PATH message for the LSP tunnel segment, allocates an incoming label associated with an incoming interface. The BNo(n) writes a cross connect on BNo(1) using the label as incoming label, the interface as incoming interface, and SLk as outgoing label, if2$k$ as outgoing interface. This completes the stitching of the E2E LSP crossing multiple area domains without running an RSVP-TE session crossing area domains.

At step 448, the source node sends the status of the LSP tunnel segment creation in the source area and the status of the creation of the E2E LSP crossing areas, with the process terminating thereafter. In one embodiment, the preceding information may be sent to a PCE via a PCC running on the source node.

In addition to stitching, in both FIG. 1 and FIG. 3, a nesting label (NL for short) may be allocated on a node attached to the destination of an LSP. A nesting interface (NI for short) associated with the NL is the interface from the destination to the attached node. NL and NI may be sent to the source of the LSP, which may send them to the destination through RSVP-TE. The source node of the LSP may be configured to push the NL under the LSP label in a packet. The destination node may be configured to pop its LSP label in the packet and use NL to forward it.

Figure 5A:
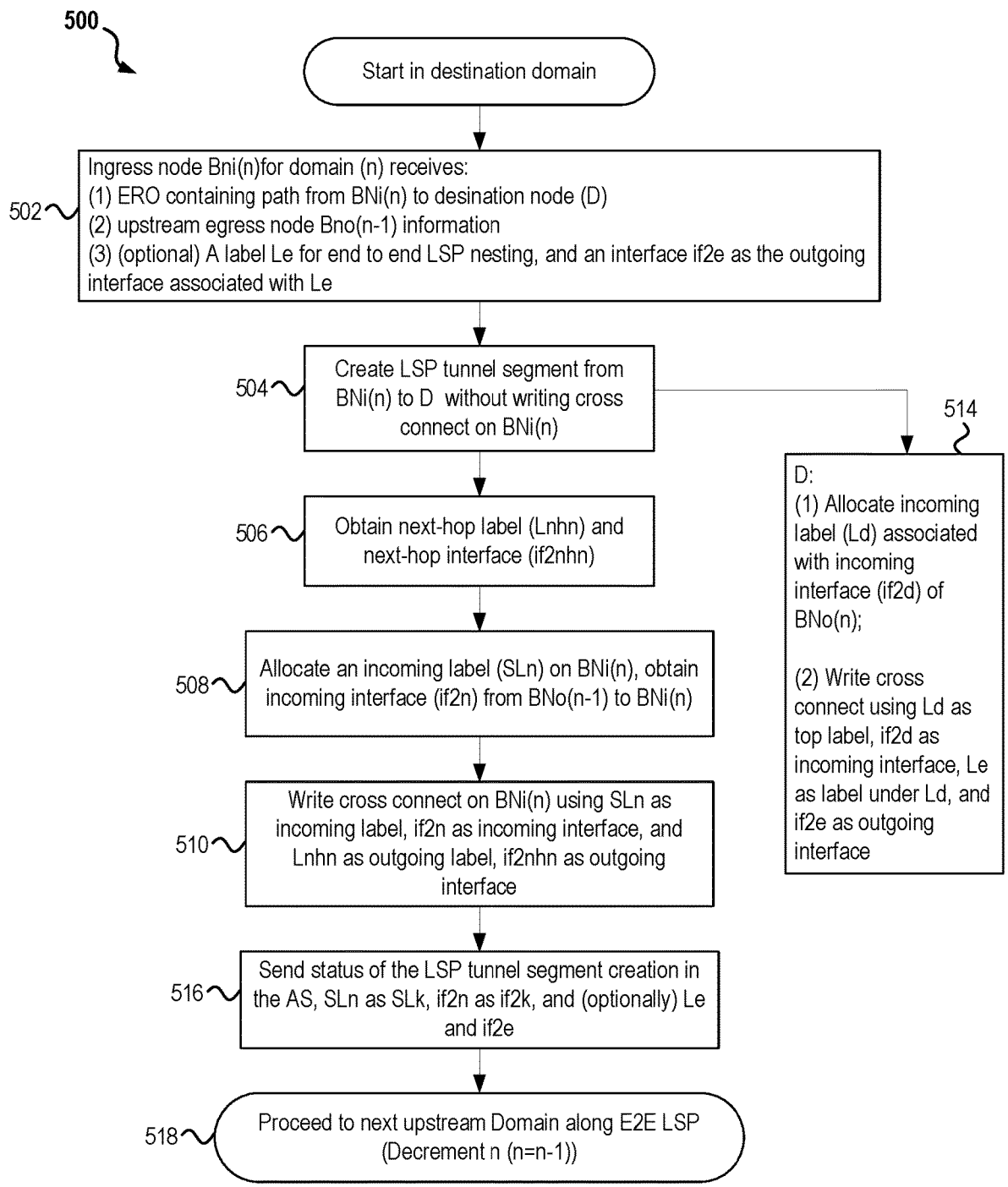
FIGS. 5A-5C illustrate a method for nesting LSP crossing multiple AS domains without running an RSVP-TE session over inter-domain links in accordance with an embodiment the present disclosure.
Figure 5B:
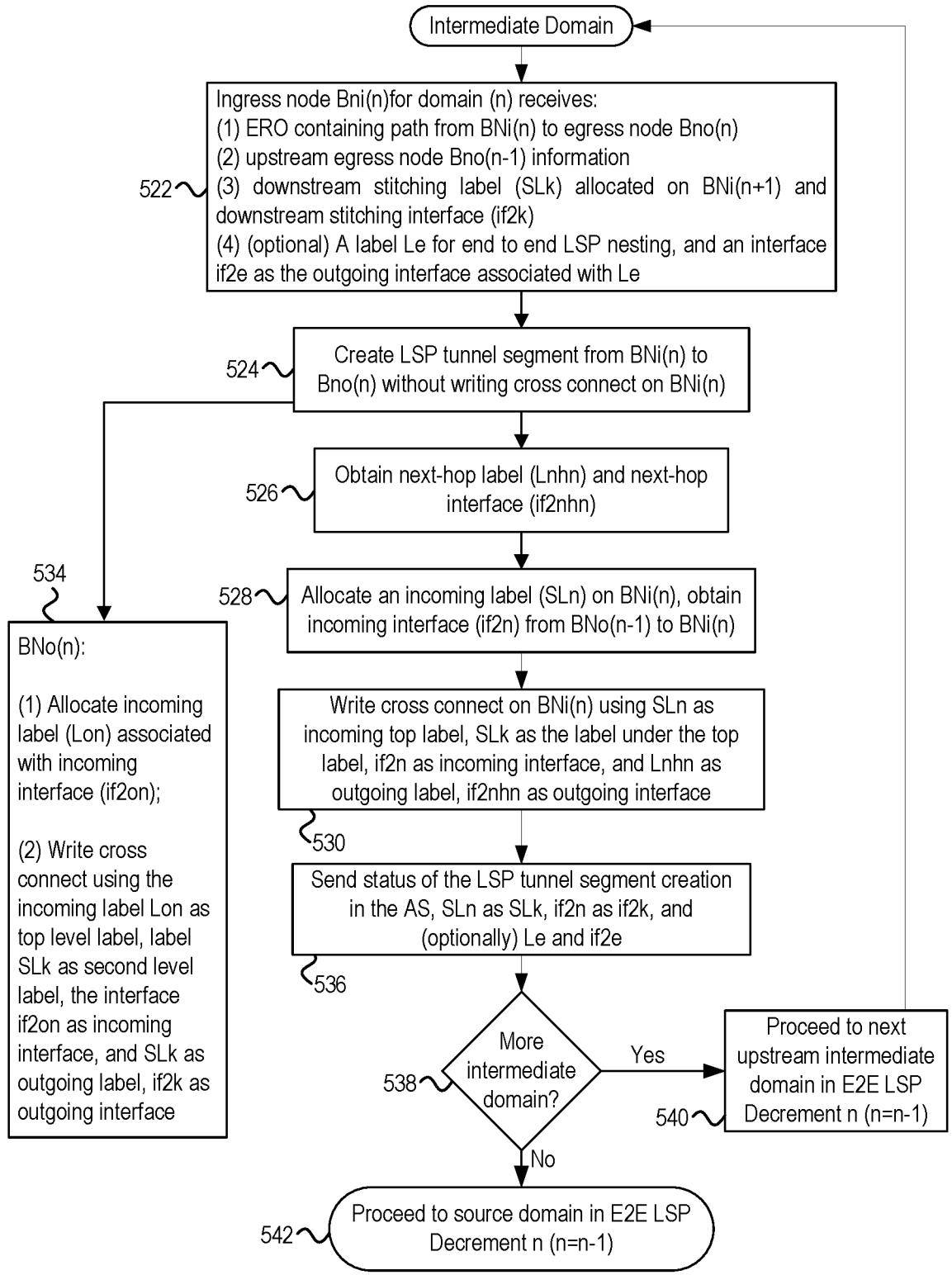
Figure 5C:
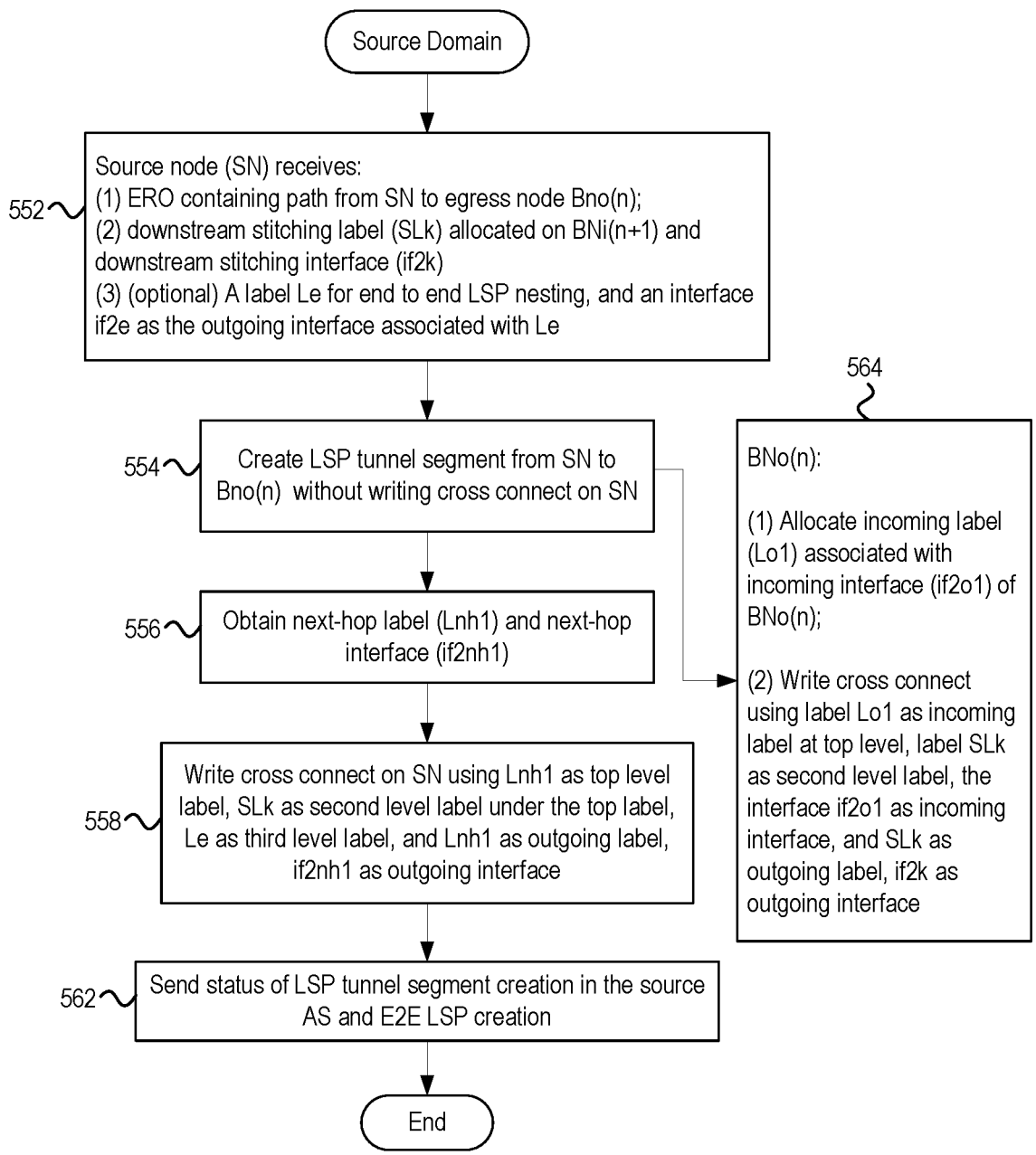

As an example, FIGS. 5A-5C illustrate a method 500 for nesting LSP crossing multiple AS domains without running an RSVP-TE session over inter-domain links in accordance with an embodiment the present disclosure. As will be described, portions of the method 500 are performed by an ingress border node BNi of each AS domain of the E2E LSP, starting with the ingress border node in the destination AS domain. For example, FIG. 5A describes the portion of the method 500 for nesting LSP crossing multiple AS domains without running an RSVP-TE session over inter-domain links that is performed by an ingress border node in a destination AS domain containing a destination node or end node of the E2E LSP. FIG. 5B describes the portion of the method 500 for nesting LSP crossing multiple AS domains without running an RSVP-TE session over inter-domain links that is performed by an ingress border node in an intermediate AS domain located between the destination AS domain and a source AS domain containing a source node or beginning node of the E2E LSP. FIG. 5C describes the portion of the method 500 for nesting LSP crossing multiple AS domains without running an RSVP-TE session over inter-domain links that is performed by the source node in the source AS domain. In one embodiment, the source node, ingress border node, and destination node that perform the method illustrated in FIGS. 5A-5C may be implemented using an apparatus as described in FIG. 7.

In FIG. 5A, beginning with the ingress border node BNi(n) in the destination AS domain, at step 502, BNi(n) receives information on egress border node BNo(n−1) in adjacent upstream AS domain, an ERO containing path information from BNi(n) to destination D, and a nesting label (Le) for E2E LSP nesting, and a nesting interface (if2e) as the outgoing interface associated with Le. In some embodiments, Le and if2e may be optional. In various embodiments, the above information may be received in a message from a PCE via a PCC running on BNi(n).

At step 504, the BNi(n) creates an LSP tunnel segment from BNi(n) to D along the path without writing a cross connect on BNi(n). In one embodiment, the LSP tunnel segment from BNi(n) to D may be created using RSVP-TE. When E2E LSP nesting is requested with Le and if2e, the BNi(n) sends a PATH message with Le and if2e to D requesting E2E LSP nesting. The destination node D, at step 514, after receiving the PATH message for the LSP segment, allocates an incoming label Ld, which is associated with an incoming interface if2d. The destination node D writes a cross connect on D using Ld as top label, if2d as incoming interface, Le as label under Ld, and if2e as outgoing interface. In one embodiment, for a packet with top label Ld from interface if2d, the cross connect pops the top label Ld and sends the packet to the outgoing interface if2e with the label under Ld as outgoing label.

At step 506, the BNi(n) obtains the next-hop label nhnL from the next-hop node of BNi(n) and the interface nhnIf from BNi(n) to the next-hop node. In one embodiment, nhnL and nhnIf are obtained in a Resv message for the LSP segment from the next-hop node.

At step 508, the BNi(n) allocates an incoming label SLn on BNi(n), and obtains the incoming interface if2n from BNo(n−1) to BNi(n). At step 510, the BNi(n) writes a cross connect on BNi(n) using SLn as incoming label, if2n as incoming interface, and nhnL as outgoing label, nhnIf as outgoing interface. In one embodiment, for a packet with top label SLn from interface if2n, the cross connect switches the incoming label SLn with the next-hop label nhnL in the packet and sends the packet to interface nhnIf.

At step 516, the BNi(n) sends the status of the LSP tunnel segment creation in the destination AS, and the incoming label SLn as SLk and the corresponding interface if2n as if2k. In some embodiments, the BNi(n) may optionally send the nesting label (Le) for E2E LSP nesting and corresponding interface if2e. In one embodiment, the above information may be sent to a PCE via a PCC running on BNi(n). At step 518, the method 500 moves to the adjacent upstream AS domain.

If the adjacent upstream AS domain is an intermediate domain, the BNi(n), as illustrated in FIG. 5B, at step 522, receives an ERO containing path information from BNi(n) to BNo(n), information about the egress border node BNo(n−1) in adjacent upstream AS domain, downstream stitching label (SLk) allocated on BNi(n+1) and downstream stitching interface (if2k), a nesting label (Le) for E2E LSP nesting, and an interface if2e as the outgoing interface associated with Le. In some embodiments, Le and if2e may be optional. In one embodiment, the above information may be received in a message from a PCE via a PCC running on BNi(n).

At step 524, the BNi(n) creates an LSP tunnel segment from BNi(n) to BNo(n) along the path using the ERO without writing a cross connect on BNi(n). In one embodiment, the LSP tunnel segment from BNi(n) to BNo(n) may be created using RSVP-TE. When LSP nesting is requested with SLk and if2k, the BNi(n) sends a PATH message with SLk and if2k to BNo(n) requesting LSP nesting. After receiving the PATH message for the LSP tunnel segment, the BNo(n), at step 534, allocates an incoming label Lon associated with an incoming interface if2on. The BNo(n) writes a cross connect on BNo(n) using the incoming label Lon as top level label, label SLk as second level label, the interface if2on as incoming interface, and SLk as outgoing label, if2k as outgoing interface. In one embodiment, for a packet with top level label Lon and second level label SLk from interface if2on, the cross connect pops the top label Lon, and sends the packet with SLk as top label to interface if2k.

At step 526, the BNi(n) obtains the label nhnL from the next-hop node NHi of BNi(n) and the interface nhnIf from BNi(n) to NHi. In one embodiment, the label nhnL and corresponding interface nhnIf may be obtained from a Resv message from NHi.

At step 528, the BNi(n) allocates an incoming label SLn on BNi(n), and obtains the incoming interface if2n from BNo(n−1) to BNi(n). At step 530, the BNi(n) writes a cross connect on BNi(n) using SLn as incoming top label, SLk as the label under the top label, if2n as incoming interface, and nhnL as outgoing label, nhnIf as outgoing interface. In one embodiment, for a packet with top level label SLn from interface if2n, the cross connect pops the top label SLn, pushes label SLk, switches label SLn with nhnL and sends the packet to interface nhnIf.

At step 536, the BNi(n) sends the status of the LSP tunnel segment creation in the intermediate AS, SLn and If2n, and Le and if2e. In one embodiment, this may be sent to a PCE by a PCC running on BNi(n). At step 538, the method 500 determines if there is an additional intermediate domain. If there is an additional intermediate domain, the method at step 540 proceeds to the next upstream intermediate domain in E2E LSP, by decrementing the value of the variable n (e.g., n=n−1), and repeats the steps in FIG. 5B. If there is no additional intermediate domain, the method 500 proceeds to the source domain, at step 542, by decrementing the value of the variable n.

In the source domain, as depicted in FIG. 5C, at step 552, the source node (i.e., BNi(1)) receives an ERO containing path from the source node (SN) to BNo(1); downstream stitching label SLk allocated on BNi(n+1) and downstream stitching interface if2k; and optionally a nesting label (Le) for E2E LSP nesting, and an interface if2e as the outgoing interface associated with Le. SN is the head node of the E2E LSP crossing Ases. BNo(1) is the egress border node of the LSP tunnel segment in the source AS. In some embodiments, the above information may be received in a message from a PCE via a PCC running on the source node.

At step 554, the SN creates an LSP tunnel segment from SN to BNo(1) along the path without writing a cross connect on SN. In one embodiment, the SN uses RSVP-TE for creating the LSP tunnel segment from SN to BNo(1). The SN sends a PATH message with SLk and if2k to BNo(1). After receiving the PATH message for the LSP tunnel segment, the BNo(1), at step 564, allocates an incoming label Lo1 associated with an incoming interface if2o1. The BNo(1) then writes a cross connect on BNo(1) using label Lo1 as incoming label at top level, label SLk as second level label, the interface if2o1 as incoming interface, and SLk as outgoing label, if2k as outgoing interface. In one embodiment, for a packet with top level label Lo1 and second level label SLk from interface if2o1, the cross connect pops the top label Lo1, and sends the packet with label SLk as top label to interface if2k.

At step 556, the BNi(n) obtains the label Lnh1 from the next-hop node NH1 of SN and the interface if2nh1 from SN to NH1. In one embodiment, the label Lnh1 and the interface if2nh1 is obtained by the BNi(n) from a Resv message for the LSP segment from NH1.

At step 558, the BNi(n) writes a cross connect on SN using Lnh1 as top level label, SLk as second level label under the top label, Le as third level label, and Lnh1 as outgoing label, if2nh1 as outgoing interface. In one embodiment, for a packet to be transported by the E2E LSP tunnel, the cross connect pushes label Lnh1, label SLk, and label Le into the packet, and sends the packet with top label Lnh1 to interface if2nh1. At step 560, the BNi(n) sends a PATH message for the LSP tunnel segment to BNo(n).

At step 562, the SN sends the status of the LSP tunnel segment creation in the source AS and the status of the creation of the E2E LSP crossing ASes, with the method 500 terminating thereafter. In one embodiment, the status information may be sent to a PCE by a PCC running on the SN.

Figure 6A:
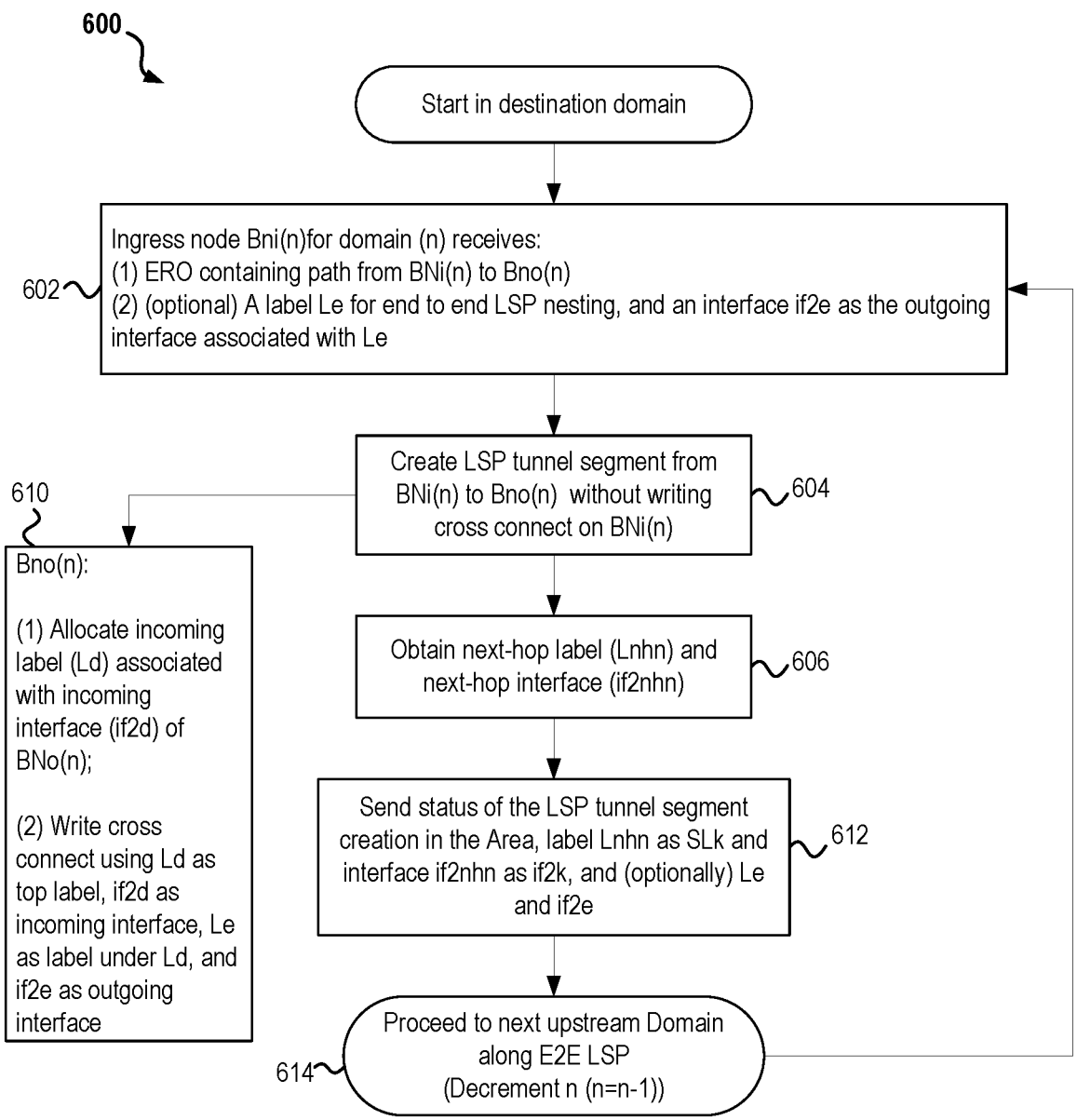
FIGS. 6A-6B are flowcharts illustrating a method for nesting LSP tunnel segments across area domains without running an RSVP-TE session over a cross connect on an ABR in accordance with the present disclosure.
Figure 6B:
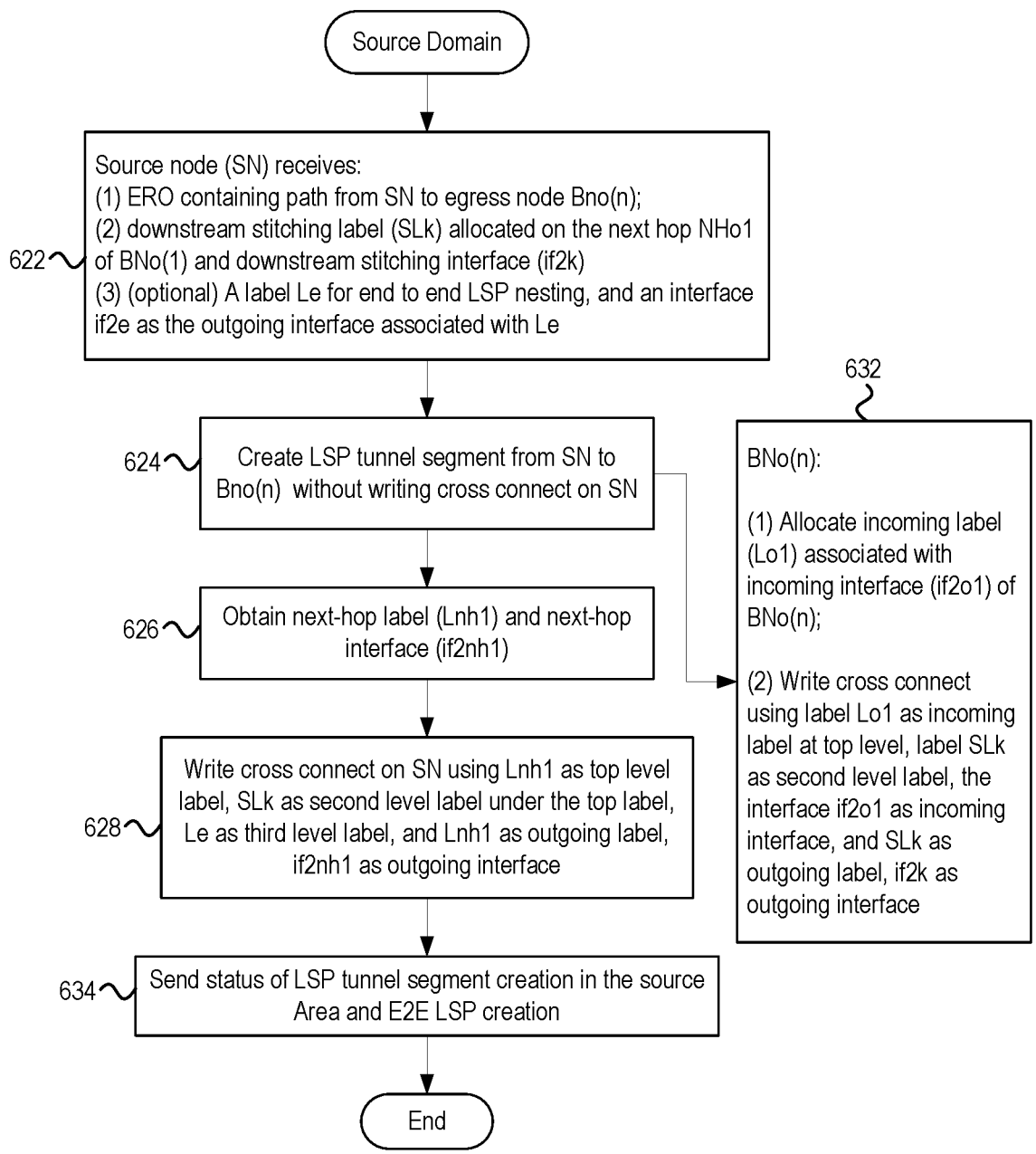

FIGS. 6A-6B are flowcharts illustrating a method 600 for nesting LSP tunnel segments across area domains without running an RSVP-TE session over a cross connect on an ABR in accordance with the present disclosure. As will be described, portions of the method 600 are performed by an ingress border node BNi of each area domain of an E2E LSP, starting with the ingress border node in the destination area domain. For example, FIG. 6A describes the portion of the method 600 for nesting LSP tunnel segments across area domains without running an RSVP-TE session over a cross connect on an ABR that is performed by an ingress border node in a destination area domain containing a destination node or end node of the E2E LSP. FIG. 6B describes the portion of the method 600 for nesting LSP tunnel segments across area domains without running an RSVP-TE session over a cross connect on an ABR that is performed by an ingress border node in an intermediate area domain located between the destination area domain and a source area domain containing a source node or beginning node of the E2E LSP. FIG. 6C describes the portion of the method 600 for nesting LSP tunnel segments across area domains without running an RSVP-TE session over a cross connect on an ABR that is performed by the source node in the source area domain. In one embodiment, the source node, ingress border node, and destination node that perform the method illustrated in FIGS. 6A-6C may be implemented using an apparatus as described in FIG. 7.

In FIG. 6A, beginning with the ingress border node BNi(n) in the destination area domain, at step 602, BNi(n) receives an ERO containing path from BNi(n) to destination D, a nesting label (Le) for E2E LSP nesting, and an interface if2e as the outgoing interface associated with Le. In some embodiments, Le and if2e may be optional. In one embodiment, the above information may be received from a PCC running on BNi(n) that receives a message from a PCE containing this input.

At step 604, BNi(n) creates an LSP tunnel segment from BNi(n) to D along the path without writing a cross connect on BNi(n). In one embodiment, the BNi(n) creates the LSP tunnel segment from BNi(n) to D using RSVP-TE. The BNi(n) sends a PATH message with Le and if2e to Bno(n) for the LSP segment. When E2E LSP nesting is requested with Le and if2e, the D, after receiving the PATH message containing Le and if2e for the LSP segment, at step 610, allocates an incoming label Ld, which is associated with an incoming interface if2d. The D writes a cross connect on D using Ld as top level label, if2d as incoming interface, Le as second label under Ld, and if2e as outgoing interface. In one embodiment, for a packet with top label Ld from interface if2d, the cross connect pops the top label Ld and sends the packet to the outgoing interface if2e with label Le as outgoing label.

At step 606, the BNi(n) obtains the label nhnL from the next-hop node of BNi(n) and the interface nhnIf from BNi(n) to the next-hop node. In one embodiment, the label nhnL and the interface nhnIf may be obtained from a Resv message for the LSP segment that is received from the next-hop node.

At step 612, the BNi(n) sends the status of the LSP tunnel segment creation in the destination area, label nhnL as SLk and interface nhnIf as if2k, and optionally Le and if2e. In one embodiment, the BNi(n) sends the status to a PCE via a PCC running on BNi(n). The method 600, at step 614, then moves to the adjacent upstream area domain, by decrementing the value of the variable n, and repeats itself for each intermediate domain between the source domain and the destination domain.

Once the method 600 reaches the source domain, the SN, at step 622, as illustrated in FIG. 6B, receives an ERO containing path from SN to BNo(1), downstream stitching label (SLk) allocated on the next-hop node (NHo1) of BNo(1) and downstream stitching interface (if2k) from BNo(1) to NHo1, and optionally a nesting label (Le) for E2E LSP nesting, and an interface if2e as the outgoing interface associated with Le. In one embodiment, the preceding information may be received in a message from a PCE that is sent to a PCC running on the SN.

The SN, at step 624, creates an LSP tunnel segment from SN to BNo(1) along the path without writing a cross connect on the SN. In one embodiment, the SN uses RSVP-TE for creating the LSP tunnel segment from SN to BNo(1). The SN sends a PATH message to BNo(1) for the LSP segment. After receiving the PATH message for the LSP tunnel segment, the BNo(1), at step 632, allocates an incoming label Lo1 associated with an incoming interface if2o1. The BNo(1), at step 632, also writes a cross connect on BNo(1) using label Lo1 as incoming label at top level, label SLk as second level label, the interface if2o1 as incoming interface, and SLk as outgoing label, if2k as outgoing interface. In one embodiment, for a packet with top level label Lo1 and second level label SLk from interface if2o1, the cross connect pops the top label Lo1, and sends the packet with label SLk (i.e., Lnho1) as top label to interface if2k (i.e., if2nho1).

At step 626, the SN obtains the label Lnh1 from the next-hop node NH1 of SN and the interface if2nh1 from SN to NH1. In one embodiment, the SN obtains the label Lnh1 from the next-hop node NH1 of SN and the interface if2nh1 from SN to NH1 in a Resv message for the LSP segment from NH1.

At step 628, the SN writes a cross connect on SN using Lnh1 as top level label, SLk as second level label under the top label, Le as third level label, and Lnh1 as outgoing label, if2nh1 as outgoing interface. In one embodiment, for a packet to be transported by the E2E LSP tunnel, the cross connect pushes label Lnh1, label SLk, and label Le into the packet, and sends the packet with top label Lnh1 to interface if2nh1.

At step 634, the SN sends the status of the LSP tunnel segment creation in the source area and the status of the creation of the E2E LSP crossing areas, with the method 600 for nesting process for LSP crossing area domains terminating thereafter. In one embodiment, the status information may be sent to a PCE via a PCC running on the SN.

Figure 7:
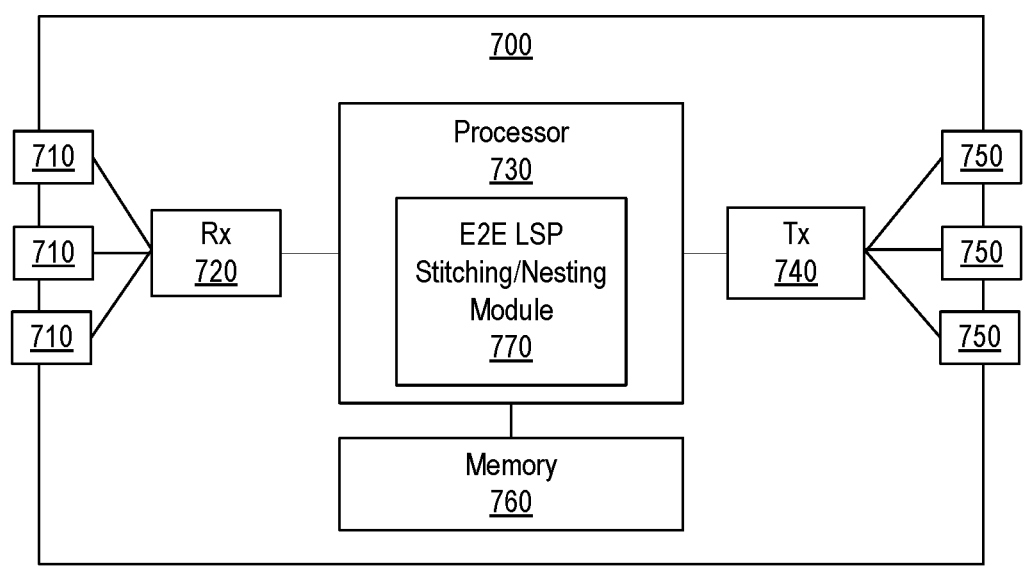
FIG. 7 is a schematic diagram of an apparatus in accordance with an embodiment of the present disclosure.

FIG. 7 is a schematic diagram of an example apparatus 700 configured to implement one or more of the methods disclosed herein according to an embodiment of the disclosure. For example, in certain embodiments, the apparatus 700 may be an ingress border node, an egress border node, a source node, a destination node, a ASBR and/or an ABR. The apparatus 700 includes ingress ports 710 and receiver units (Rx) 720 for receiving data. The apparatus 700 includes a processor, logic unit, or central processing unit (CPU) 730 to process the data and execute various instructions. The apparatus 700 includes transmitter units (Tx) 740 and egress ports 750 for transmitting data. The apparatus 700 includes a memory 760 for storing the data and executable instructions. The apparatus 700 may also comprise optical-to-electrical (OE) components and electrical-to-optical (EO) components (not depicted) coupled to the ingress ports 710, the receiver units 720, the transmitter units 740, and the egress ports 750 for converting optical signal to electrical signals, and vice versa.

The memory 760 may include one or more disks, tape drives, or solid-state drives and may be used as an over-flow data storage device, to store programs when such programs are selected for execution, or to store instructions and data that are read during program execution. The memory 760 may be volatile and/or non-volatile and may be read-only memory (ROM), random-access memory (RAM), ternary content-addressable memory (TCAM), or static random-access memory (SRAM).

The processor 730 may be implemented by any suitable combination of hardware, middleware, firmware, and software. The processor 730 may be implemented as one or more CPU chips, cores (e.g. as a multi-core processor), field-programmable gate arrays (FPGAs), application specific integrated circuits (ASICs), or digital signal processors (DSPs). The processor 730 is in communication with the ingress ports 710, receiver units 720, transmitter units 740, egress ports 750, and memory 760. In one embodiment, the memory 760 may store an E2E LSP stitching/nesting module 770. The E2E LSP stitching/nesting module 770 comprises executable instructions for implementing the various embodiments disclosed herein. The processor 730 is configured to execute these instructions along with other instructions. In various embodiments, the apparatus 700 may include additional or alternative components than those described in FIG. 7 for implementing the various embodiments disclosed herein.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, units, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method for stitching segments of a Label Switched Path (LSP) crossing multiple autonomous system (AS) domains that are connected by inter-domain links to form an end-to-end (E2E) LSP without running a Resource Reservation Protocol-Traffic Engineering (RSVP-TE) session over the inter-domain links, the method comprising:
receiving, by an ingress border node BNi(n) in a domain (n) where n is an integer representing a domain being connected by the E2E LSP, a PATH message that comprises a Session Attribute Object as defined by RSVP-TE, the Session Attribute Object comprises a stitching bit set to indicate that the E2E LSP is stitched without running the RSVP-TE session over the inter-domain links of the multiple AS domains;
obtaining, by the ingress border node BNi(n), a next-hop node label (nhnL) and a next-hop node interface (nhnIf) of a next-hop node (nhn) along the E2E LSP;
obtaining, by the ingress border node BNi(n), an incoming interface (if2n) from an upstream egress node BNo(n−1) to the ingress border node BNi(n); and
writing, by the ingress border node BNi(n), a cross connect on the ingress border node BNi(n) using an incoming label (SLn) as incoming label, if2n as incoming interface, nhnL as outgoing label, and nhnIf as outgoing interface.

2. The method of claim 1, further comprising receiving, by the ingress border node BNi(n), an Explicit Route Object (ERO) containing a path from the ingress border node BNi(n) in the domain(n) to an egress border node BNo(n) in the domain(n).

3. The method of claim 2, further comprising creating, by the ingress border node BNi(n), an LSP tunnel segment from the ingress border node BNi(n) to the egress border node BNo(n) in the domain(n) using the ERO.

4. The method of claim 3, further comprising sending, by the ingress border node BNi(n), a status of the LSP tunnel segment creation in the domain(n) to a Path Computation Element (PCE).

5. The method of claim 4, further comprising sending, by the ingress border node BNi(n), the incoming label (SLn) and the incoming interface (if2n) to the PCE for enabling the upstream egress node BNo(n−1) to write a cross connect on the upstream egress node BNo(n−1) that stitches an upstream LSP tunnel segment in domain(n−1) to the LSP tunnel segment in domain(n).

6. The method of claim 5, further comprising receiving, by the ingress border node BNi(n), a downstream stitching label (SLk) allocated on a downstream ingress border node BNi(n+1) and a downstream stitching interface (if2k) associated with the downstream stitching label (SLk).

7. The method of claim 6, further comprising sending, by the ingress border node BNi(n), a message to the egress border node BNo(n), the message comprising the downstream stitching label (SLk) and the downstream stitching interface (if2k) for enabling the egress border node BNo(n) to write a cross connect on the egress border node BNo(n) that stitches the LSP tunnel segment in domain(n) to a downstream LSP tunnel segment in domain(n+1).

8. A method for nesting a Label Switched Path (LSP) crossing multiple area domains without running a Resource Reservation Protocol-Traffic Engineering (RSVP-TE) session over a cross connect on an Area Border Router (ABR), the method comprising:
   receiving, by an ingress border node BNi(n) in a domain (n) where n is an integer representing a domain being connected by the E2E LSP, a PATH message that comprises a Session Attribute Object as defined by RSVP-TE, the Session Attribute Object comprises a nesting bit set to indicate that the E2E LSP is nested without running the RSVP-TE session over the inter-domain links of the multiple AS domains;
   receiving, by the ingress border node BNi(n), an Explicit Route Object (ERO) containing a path from the ingress border node BNi(n) in a domain(n) to an egress border node BNo(n) in the domain(n), a nesting label (Le) for E2E LSP nesting, and a nesting interface (if2e) as an outgoing interface associated with the nesting label (Le);
   creating, by the ingress border node BNi(n), an LSP tunnel segment from the ingress border node BNi(n) to the egress border node BNo(n) in the domain(n) using the ERO;
   obtaining, by the ingress border node BNi(n), a next-hop node label (Lnhn) and a next-hop node interface (if2nhn) of a next-hop node (nhn) along the LSP tunnel segment; and
   sending, by the ingress border node BNi(n), a message to the egress border node BNo(n) that comprises the nesting label (Le) and the nesting interface (if2e) for enabling the egress border node BNo(n) to write a cross connect on the egress border node BNo(n) using the nesting label (Le) as a second level label and using the nesting interface (if2e) as an outgoing interface for stitching the LSP tunnel segment in domain(n) to a downstream LSP tunnel segment in domain(n+1).

9. The method of claim 8, further comprising sending, by the ingress border node BNi(n), a status of the LSP tunnel segment creation in the domain(n), the next-hop node label (Lnhn) as the downstream stitching label (SLk), and the next-hop node interface (if2nhn) as the downstream stitching interface (if2k) to a Path Computation Element (PCE).

10. The method of claim 8, further comprising:
   receiving, by the ingress border node BNi(n), a downstream stitching label (SLk) allocated on the next-hop node (NHo1) of BNo(1) and a downstream stitching interface (if2k); and
   writing, by the ingress border node BNi(n), a cross connect on the ingress border node BNi(n) using the next-hop node label (Lnhn) as top level label, SLk as second level label under the top level label, Le as a third level label, and Lnhn as outgoing label, and if2nhn as outgoing interface.

11. An ingress border node BNi(n) configured to stitch segments of a Label Switched Path (LSP) crossing multiple autonomous system (AS) domains that are connected by inter-domain links to form an end-to-end (E2E) LSP without running a Resource Reservation Protocol-Traffic Engineering (RSVP-TE) session over the inter-domain links, the ingress border node BNi(n) comprising:
   a network communication interface configured to enable communication over a network;
   memory configured to store data and executable instructions; and
   a processing unit configured to execute the executable instructions to:
      receive a PATH message that comprises a Session Attribute Object as defined by RSVP-TE, the Session Attribute Object comprises a stitching bit set to indicate that the E2E LSP is stitched without running the RSVP-TE session over the inter-domain links of the multiple AS domains;
      obtain a next-hop node label (Lnhn) and a next-hop node interface (if2nhn) of a next-hop node (nhn) along the E2E LSP;
      obtain an incoming interface (if2n) from an upstream egress node BNo(n−1) to the ingress border node BNi(n); and
      write a cross connect on the ingress border node BNi(n) using an incoming label (SLn) as incoming label, if2n as incoming interface, Lnhn as outgoing label, and if2nhn as outgoing interface.

12. The ingress border node BNi(n) of claim 11, wherein the processing unit further executes the executable instructions to receive an Explicit Route Object (ERO) containing a path from the ingress border node BNi(n) in a domain(n) to an egress border node BNo(n) in the domain(n).

13. The ingress border node BNi(n) of claim 12, wherein the processing unit further executes the executable instructions to create an LSP tunnel segment from the ingress border node BNi(n) to the egress border node BNo(n) in the domain(n) using the ERO.

14. The ingress border node BNi(n) of claim 13, wherein the processing unit further executes the executable instructions to send a status of the LSP tunnel segment creation in the domain(n) to a Path Computation Element (PCE).

15. The ingress border node BNi(n) of claim 14, wherein the processing unit further executes the executable instructions to send the incoming label (SLn) and the incoming interface (if2n) to the PCE for enabling the upstream egress node BNo(n−1) to write a cross connect on the upstream egress node BNo(n−1) that stitches an upstream LSP tunnel segment in domain(n−1) to the LSP tunnel segment in domain(n).

16. The ingress border node BNi(n) of claim 15, wherein the processing unit further executes the executable instructions to receive a downstream stitching label (SLk) allocated on a downstream ingress border node BNi(n+1) and a downstream stitching interface (if2k) associated with the downstream stitching label (SLk).

17. The ingress border node BNi(n) of claim 16, wherein the processing unit further executes the executable instructions to send a message to the egress border node BNo(n), the message comprising the downstream stitching label (SLk) and the downstream stitching interface (if2k) for enabling the egress border node BNo(n) to write a cross connect on the egress border node BNo(n) that stitches the LSP tunnel segment in domain(n) to a downstream LSP tunnel segment in domain(n+1).

18. An ingress border node BNi(n) configured to enable nesting of a Label Switched Path (LSP) crossing multiple autonomous system (AS) domains without running a Resource Reservation Protocol-Traffic Engineering (RSVP-TE) session over inter-domain links, the ingress border node BNi(n) comprising:
   a network communication interface configured to enable communication over a network;
   memory configured to store data and executable instructions; and
   a processing unit configured to execute the executable instructions to:
      receive a PATH message that comprises a Session Attribute Object as defined by RSVP-TE, the Ses1,sion Attribute Object comprises a nesting bit set to indicate that the E2E LSP is nested without running the RSVP-TE session over the inter-domain links of the multiple AS domains;

receive an Explicit Route Object (ERO) containing a path from the ingress border node BNi(n) in a domain(n) to an egress border node BNo(n) in the domain(n), upstream egress node BNo(n−1) information, downstream stitching label (SLk) allocated on BNi(n+1) and downstream stitching interface (if2$k$), a nesting label (Le) for end-to-end (E2E) LSP nesting, and a nesting interface (if2$e$) as an outgoing interface associated with the nesting label (Le);

create an LSP tunnel segment from the ingress border node BNi(n) to the egress border node BNo(n) in the domain(n) using the ERO;

obtain a next-hop node label (Lnhn) and a next-hop node interface (if2$nhn$) of a next-hop node (nhn) along the LSP tunnel segment;

obtain an incoming interface (if2$n$) from an upstream egress node BNo(n−1) to the ingress border node BNi(n); and write a cross connect on the ingress border node BNi(n) using an incoming label (SLn) as incoming top label, SLk as the label under the top label, if2$n$ as incoming interface, Lnhn as outgoing label, and if2$nhn$ as outgoing interface.

19. The ingress border node BNi(n) of claim 18, wherein the processing unit further executes the executable instructions to send a message to the egress border node BNo(n) that comprises the downstream stitching label (SLk) and the downstream stitching interface (if2$k$) for enabling the egress border node BNo(n) to write a cross connect on the egress border node BNo(n) using the downstream stitching label (SLk) as a second level label and as an outgoing label, and using the downstream stitching interface (if2$k$) as an outgoing interface configured to stitch the LSP tunnel segment in domain(n) to a downstream LSP tunnel segment in domain (n+1).

20. The ingress border node BNi(n) of claim 19, wherein the processing unit further executes the executable instructions to send a status of the LSP tunnel segment creation in the domain(n), the incoming label (SLn) as the downstream stitching label (SLk), and the incoming interface (if2$n$) as the downstream stitching interface (if2$k$) to a Path Computation Element (PCE).

* * * * *

UNITED STATES PATENT AND TRADEMARK OFFICE
CERTIFICATE OF CORRECTION

PATENT NO. : 10,812,369 B2
APPLICATION NO. : 15/957661
DATED : October 20, 2020
INVENTOR(S) : Huaimo Chen Page 1 of 2

It is certified that error appears in the above-identified patent and that said Letters Patent is hereby corrected as shown below:

In the Claims

Column 23, Lines 44-54, Claim 10, should read:
10. The method of claim 8, further comprising:
    receiving, by the ingress border node BNi(n), a downstream stitching label (SLk) allocated on the next-hop node (NHo1) of BNo(1) and a downstream stitching interface (if2k); and
    writing, by the ingress border node BNi(n), a cross connect on the ingress border node BNi(n) using the next-hop node label (Lnhn) as top level label, SLk as second level label under the top level label, Le as a third level label, Lnhn as outgoing label, and if2nhn as outgoing interface.

Column 24, Lines 54-67, through Column 26, Lines 1-3, Claim 18, should read:
18. An ingress border node BNi(n) configured to enable nesting of a Label Switched Path (LSP) crossing multiple autonomous system (AS) domains without running a Resource Reservation Protocol-Traffic Engineering (RSVP-TE) session over inter-domain links, the ingress border node BNi(n) comprising:
    a network communication interface configured to enable communication over a network;
    memory configured to store data and executable instructions; and
    a processing unit configured to execute the executable instructions to:
        receive a PATH message that comprises a Session Attribute Object as defined by RSVP-TE, the Session Attribute Object comprises a nesting bit set to indicate that the E2E LSP is nested without running the RSVP-TE session over the inter-domain links of the multiple AS domains;
        receive an Explicit Route Object (ERO) containing a path from the ingress border node BNi(n) in a domain (n) to an egress border node BNo(n) in the domain(n), upstream egress node BNo(n-1) information, downstream stitching label (SLk) allocated on BNi(n+1) and downstream stitching interface (if2k), a nesting label (Le) for end-to-end (E2E) LSP nesting, and a nesting interface (if2e) as an outgoing interface associated with the nesting label (Le);
        create an LSP tunnel segment from the ingress border node BNi(n) to the egress border node BNo(n) in the domain(n) using the ERO;
        obtain a next-hop node label (Lnhn) and a next-hop node interface (if2nhn) of a next-hop node (nhn) along the LSP tunnel segment;

Signed and Sealed this
Eighth Day of December, 2020

Andrei Iancu
*Director of the United States Patent and Trademark Office* obtain an incoming interface (if2n) from an upstream egress node BNo(n-1) to the ingress border node BNi(n); and write a cross connect on the ingress border node BNi(n) using an incoming label (SLn) as incoming top label, SLk as the label under the top label, if2n as incoming interface, Lnhn as outgoing label, and if2nhn as outgoing interface.